United States Patent
Seto et al.

(12)

(10) Patent No.: US 6,267,072 B1
(45) Date of Patent: *Jul. 31, 2001

(54) INDICATING INSTRUMENT

(75) Inventors: Tatsuya Seto; Hirofumi Ikeuchi; Ryouichi Nishikawa; Masaaki Muraki, all of Kariya; Hiroshi Niimi, Chita-gun; Naoyuki Aoki, Kariya; Kozo Ono, Anjo, all of (JP)

(73) Assignee: Nippondenso Co., Ltd., Kariya (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/552,575

(22) Filed: Nov. 3, 1995

(30) Foreign Application Priority Data

Nov. 11, 1994 (JP) .................................................. 6-277648
Jul. 20, 1995 (JP) .................................................. 7-183674

(51) Int. Cl.⁷ .............................. G01R 1/08; G01D 11/28
(52) U.S. Cl. ...................................... 116/287; 116/286
(58) Field of Search .................................. 116/62.1, 62.4, 116/286, 287, 288, DIG. 36; 362/23, 26, 27, 31, 30

(56) References Cited

U.S. PATENT DOCUMENTS

| | | | |
|---|---|---|---|
| 2,272,806 | * | 2/1942 | Klein et al. .................. 116/286 X |
| 2,916,011 | * | 12/1959 | Molis ................................ 116/288 |
| 3,503,365 | * | 3/1970 | Baez et al. ...................... 116/287 |
| 4,656,561 | * | 4/1987 | Shinbo et al. .................... 362/30 |
| 5,005,306 | * | 4/1991 | Kinstler ........................... 40/600 |
| 5,143,433 | | 9/1992 | Farrell ............................. 362/29 |
| 5,339,550 | * | 8/1994 | Hoffman .......................... 40/544 |
| 5,450,292 | * | 9/1995 | Yokoyama et al. ............. 362/31 |
| 5,521,797 | * | 5/1996 | Kashima et al. ................ 362/31 |

FOREIGN PATENT DOCUMENTS

| | | | |
|---|---|---|---|
| 905448 | * | 3/1954 | (DE) .................................. 362/23 |
| 15369 | * | 3/1956 | (DE) .................................. 362/23 |
| 3347014 | * | 7/1985 | (DE) .................................. 116/288 |
| 029638 | | 6/1981 | (EP) . |
| 351259 | | 1/1990 | (EP) . |
| 602385 | | 6/1994 | (EP) . |
| 616922 | | 9/1994 | (EP) . |
| 2023834 | | 1/1980 | (GB) . |
| 454334 | * | 1/1950 | (IT) ................................... 362/23 |
| 53-43948 | | 3/1978 | (JP) . |
| 54-81750 | | 5/1979 | (JP) . |
| 57-75595 | | 4/1982 | (JP) . |
| 57-34892 | | 7/1982 | (JP) . |
| 58-12095 | | 3/1983 | (JP) . |
| 2-26019 | | 2/1985 | (JP) . |
| 64-36875 | | 3/1989 | (JP) . |
| 2-80916 | | 3/1990 | (JP) . |
| 2-101229 | | 8/1990 | (JP) . |
| 2-150515 | | 12/1990 | (JP) . |
| 3-183912 | | 8/1991 | (JP) . |
| 3-99314 | | 10/1991 | (JP) . |
| 4-69791 | | 5/1992 | (JP) . |
| 4-72208 | | 11/1992 | (JP) . |
| 6-2150 | | 1/1994 | (JP) . |
| 7-239251 | | 9/1995 | (JP) . |

OTHER PUBLICATIONS

Patent Abstract of Japan, vol. 12 No. 377 (P–768) 10/1988 re JP–A 63123082.

* cited by examiner

*Primary Examiner*—Hezron Williams
*Assistant Examiner*—Willie Morris Worth
(74) *Attorney, Agent, or Firm*—Pillsbury Winthrop LLP

(57) ABSTRACT

An indicating instrument includes a generally straight illumination lamp or cold cathode fluorescent lamp and a light conducting plate which are disposed on the back of a dial plate. The dial plate has plurality of trans-illuminous gauge or meter patterns. The cold cathode fluorescent lamp is disposed longitudinally at an upper side of the light conducting plate to guide the light of the lamp to the trans-illuminous gauge or meter patterns.

3 Claims, 37 Drawing Sheets

INDICATING INSTRUMENT

CROSS REFERENCE TO RELATED APPLICATION

The present application is based on and claims priority from Japanese Patent Applications Hei 6-277648 filed on Nov. 11, 1994 and Hei 7-183674 filed on Jul. 20, 1995, the contents of which are incorporated herein by reference.

BACKGROUND OF THE INVENTION

1. Field of the Invention

The present invention relates to an indicating instrument for use in various devices or machines and particularly in an automobile.

2. Description of Related Art

In a conventional gauge installed in an automobile, generally an arc-shaped lighting tube is disposed behind a trans-illuminous dial plate along the indicating portion to illuminate the front surface thereof as shown in Japanese Unexamined Patent Publication Hei 2-80916.

Since the lighting tube is disposed along the indicating portion, the thickness of the above gauge can be made thin.

However, if a plurality of such gauges are installed in a car, the combined instrument structure becomes rather complicated and requires many parts, resulting in a cost increase in manufacturing.

In addition, different arc-shaped-lighting-tubes have to be provided for gauges having different-shaped dial plates.

Japanese Unexamined Patent Publication Hei 3-183912 discloses a dial gauge which has a partial-cylindrical reflector secured through a light diffusing plate to the back of the dial plate and a straight lighting tube disposed in the reflector. A driving shaft for a dial indicator extends from the back of the reflector through the reflector, the diffusing plate and the dial plate to the front of the dial plate.

However, the driving shaft for the dial indicator of the above described gauge is extremely long and the gauge becomes considerably thick. The extremely long shaft may increase the response time of the indicator and the hysteresis of the indication, thereby decreasing indication accuracy.

SUMMARY OF THE INVENTION

The present invention is made in view of the foregoing problems, and has a primary object of providing a thin and highly responsive indicating instrument having a straight illumination lamp and a light conducting plate.

Another object of the present invention is to provide an indicating instrument which includes a dial plate having a patterned trans-illuminous portion, a straight illumination lamp disposed behind the dial plate near the patterned portion, a light conducting plate disposed behind the dial plate in an optical path between the illumination lamp and the patterned trans-illuminous portion, whereby the patterned trans-illuminous portion is illuminated by the straight illumination lamp evenly using a simple structure.

Another object of the present invention is to provide a simple and thin indicating instrument which includes a straight illumination lamp, a plurality of patterned trans-illuminous portions, a light conducting plate having through holes respectively corresponding to through-holes in the patterned trans-illuminous portions, a plurality of driving units having driving shafts respectively corresponding to the patterned portions, and a plurality of luminous indicators connected respectively to the shafts through the respective through holes of the light conducting plate, whereby the patterned trans-illuminous portions and the luminous indicators are illuminated by a single straight illumination lamp evenly.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENT

Preferred embodiments will be described with reference to appended drawings hereafter.

(First Embodiment)

Figure 1:
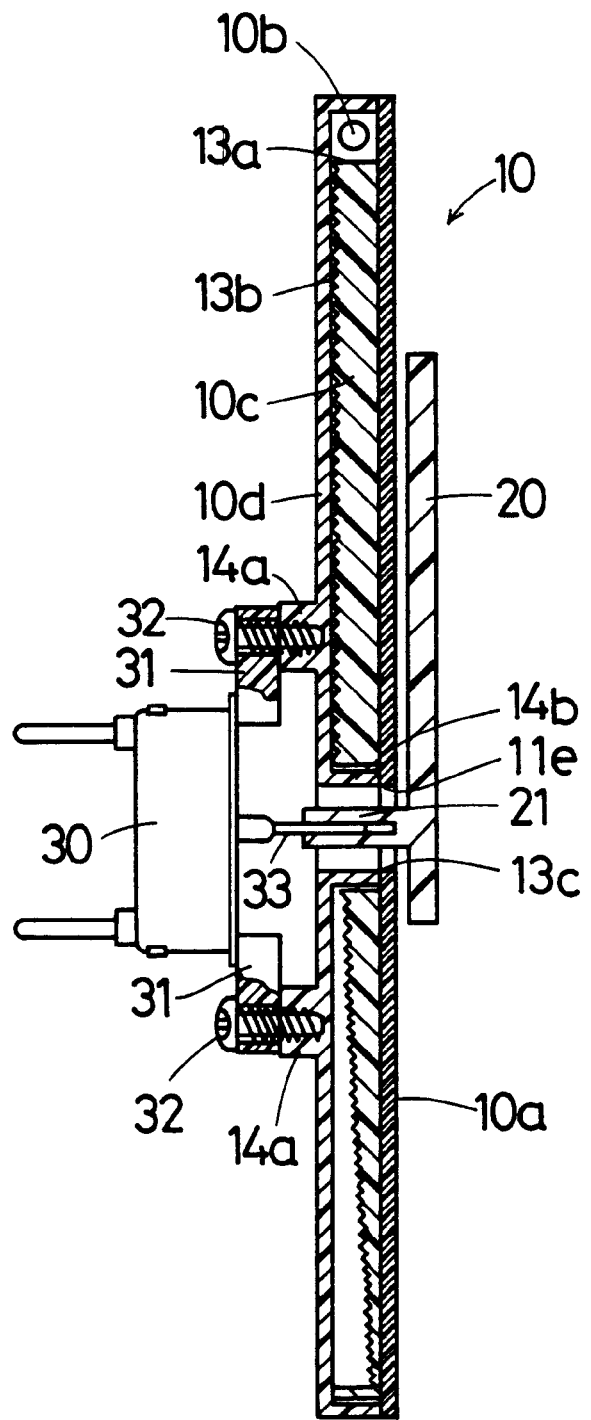
FIG. 1 is a cross-sectional side view illustrating a main portion of an indicating instrument according to a first embodiment of the present invention.
Figure 2:
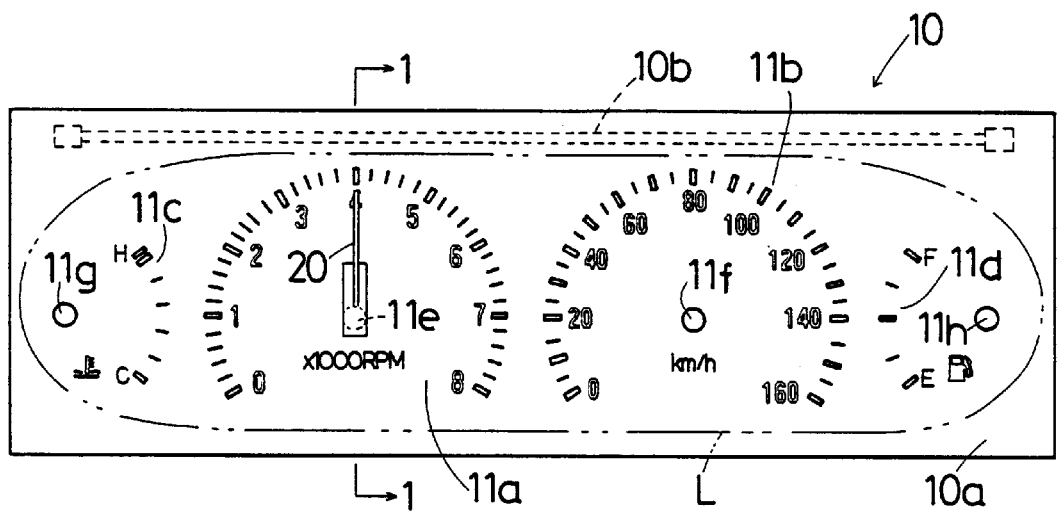
FIG. 2 is a front view illustrating the first embodiment.

FIG. 1 and FIG. 2 illustrate an indicating instrument according to a first embodiment of the present invention. The instrument has a dial plate unit 10, which is composed of a dial plate, a straight cold-cathode-fluorescent lighting tube or lamp 10b, a light conducting plate 10c and a holder 10d.

The dial plate 10a according to this embodiment composes an instrument panel disposed in the compartment of a vehicle. The dial plate 10a has a number of patterned trans-illuminous portions 11a, 11b, 11c and 11d which are stamped out from a transparent plate whose front surface is covered with a dark layer (hereinafter referred to as the surface of the dial plate 10a).

The patterned trans-illuminous portion 11a is composed of an arc-shaped graded scale pattern indicating the engine rotational speed and a unit pattern indicating the unit of the rotational speed (e.g.×1000 RPM). The patterned trans-illuminous portion 11b is composed of an arc-shaped graded scale pattern indicating the vehicle speed and a units pattern indicating the unit of the vehicle speed (e.g. km/h). The patterned trans-illuminous portion 11c is composed of an arc-shaped graded scale pattern indicating the cooling water temperature and a symbol mark indicating the water temperature. The patterned trans-illuminous portion 11d is composed of an arc-shaped graded scale pattern indicating an amount of fuel and a symbol mark indicating the fuel. The patterned trans-illuminous portions 11a, 11b, 11c and 11d altogether are indicated by a reference character L in FIG. 2. Portions of the surface of the dial plate other than the trans-illuminous portion L compose opaque portions covered with the black layer.

Figure 3:
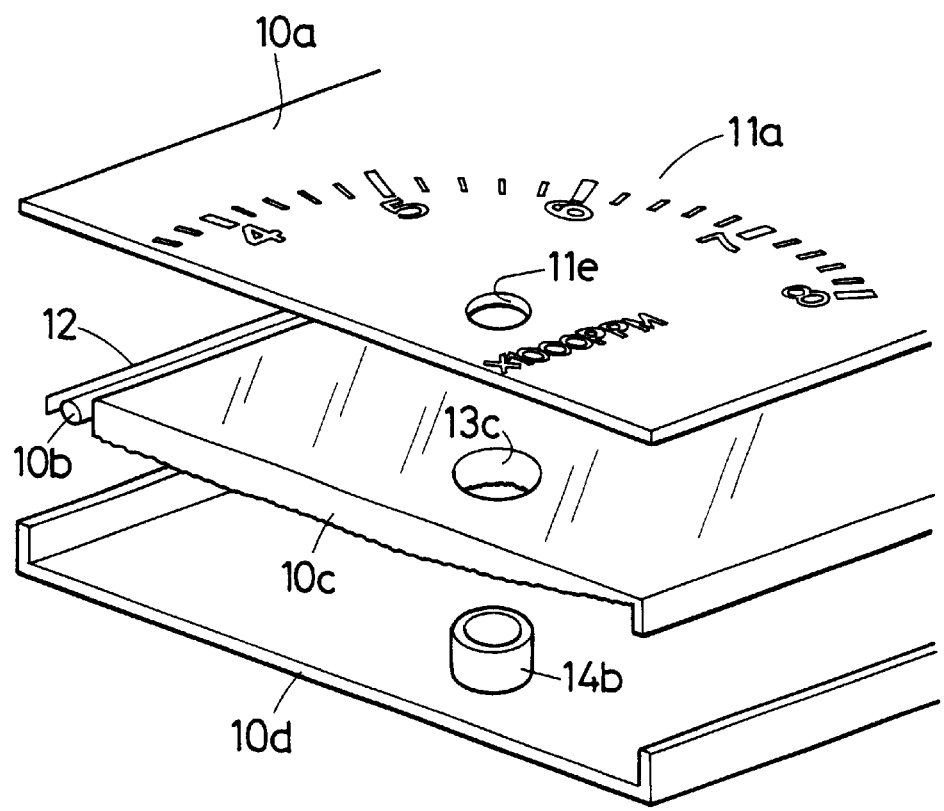
FIG. 3 is an exploded view illustrating main portions of a dial plate, a light diffusing plate and a holder of the first embodiment shown in FIG. 1.

The cold-cathode-fluorescent lamp 10b is disposed longitudinally at an upper portion on the back of the dial plate 10a as shown in FIG. 1 and FIG. 2. A tape-like heater 12 is attached to a surface of the fluorescent lamp 10b as shown in FIG. 3 to heat the fluorescent lamp 10b when it is colder than a designated temperature. The full length of the fluorescent lamp 10b corresponds to the total length of the trans-illuminous portion indicated by L. The outer diameter of the fluorescent lamp 10b is preferably about 3 mm in view of the reduced thickness of the dial plate unit 10 and luminosity efficiency thereof.

The light conducting plate 10c is made of transparent material such as acrylic resin or polycarbonate and disposed on the back of the dial plate 10a adjacent to the cold cathode fluorescent lamp 10b as shown in FIG. 1 and FIG. 3. An upper end surface of the light conducting plate 10c is disposed in parallel with the fluorescent lamp 10b to face the lighting surface thereof. The light conducting plate 10c has an upper half flat portion as thick as 5 mm and a lower half portion which has beveled back surface from the center to the bottom. A frosted surface is formed on the back of the light conductive plate 10c to diffuse the light in the plate 10c. The frosted surface at portion close to the lamp 10b is formed to be rougher than the surface at portions remote from the lamp 10b. The total reflection of the light can be also utilized instead of the frosted surface.

Light which is emitted by the cold cathode fluorescent lamp 10b into the light conductive plate 10c from an upper end 13a thereof is diffused by the frosted surface and is guided by the beveled back surface of the light conducting plate 10c, and enters the patterned trans-illuminous portions 11a, 11b, 11c and 11d.

The holder 10d is formed from a light-shielding material in a shallow flat pan or tray shape to accommodate the cold cathode fluorescent lamp 10b and the light conducting plate 10c and fixed to the dial plate 10a. The indicating instrument has respective indicators for indicating the engine rotational speed (RPM), the vehicle speed; the cooling water temperature and the fuel amount and their driving unit. However, only an indicator 20 for the engine rotational speed and its driving unit 30 are illustrated in FIG. 1 and FIG. 2.

The driving unit 30 has two flange portions 31, which are fixed to corresponding projecting portions 14a formed on an outer surface of the holder 10d by screws. An indicator shaft 33 extends from the driving unit 30 and is inserted into a cylindrical opening 14b of the holder 10d and a through hole 11e of the dial plate 10a. The through hole 11e is located at a central portion of the arc-shaped graded scale pattern of the patterned trans-illuminous portion 11a. An outer periphery of the cylindrical opening 14b is disposed in a through hole 13c of the light conducting plate 10c. The indicator 20 has a boss 21, which is fitted to the indicator shaft 33 to rotate together.

Other indicators and driving units of the speedometer, temperature gauge, and fuel gauge are installed into the respective patterned trans-illuminous portions 11b, 11c and 11d which have through holes 11f, 11g and 11h corresponding to the through hole 11e in substantially the same manner as the indicator 20 and the driving unit 30. The light conducting plate 10c also has through holes (not shown) and the holder 10d has cylindrical openings (not shown), at portions corresponding to the through holes 11f, 11g and 11h.

When the cold cathode fluorescent lamp 10b emits light, the light enters the inside of the light conducting plate 10c from the upper end surface 13a. The light is reflected and diffused effectively by the frosted surface 13b and enters the inside of the dial plate 10a equally over the entire portions and passes across the patterned trans-illuminous portions 11a, 11b, 11c and 11d.

As a result, the patterned trans-illuminous portions 11a, 11b, 11c and 11d are illuminated evenly with high contrast between the patterned trans-illuminous portions 11a, 11b, 11c and 11d and the background portions, providing high visibility of meters and gauges.

Since the fluorescent lamp 10b and the light conducting plate 10c are disposed on the same surface behind the dial plate 10a, the dial plate unit 10 can be made very thin. As a result, the indicator shaft can be made short, thereby improving the response time and accuracy of the indication.

Since the single and straight cold cathode fluorescent lamp 10b is used to illuminate the dial plate 10c, the indicating instrument can be made simple at a reduced cost.

Since the single light conducting plate 10c is used for conducting the light from the fluorescent lamp 10a, the number or the shape of the patterned trans-illuminous portions can be changed easily by changing the number and position of the through holes.

Figure 4:
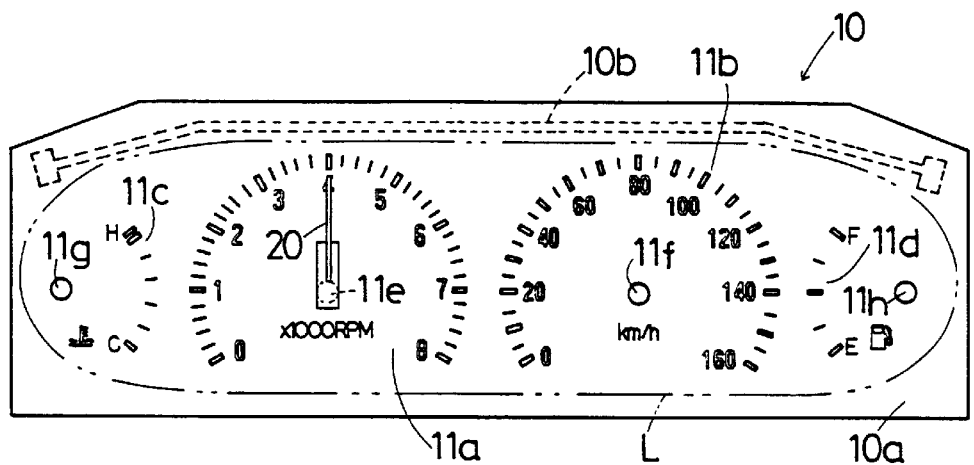
FIG. 4 is a front view illustrating a first variation of the first embodiment.

FIG. 4 illustrates a variation of the first embodiment. The dial plate 10a of this variation has slanted upper corners and the cold cathode fluorescent lamp is bent to lie along the periphery of the dial plate as shown in FIG. 4. Other portions are the same as the first embodiment.

Figure 5:
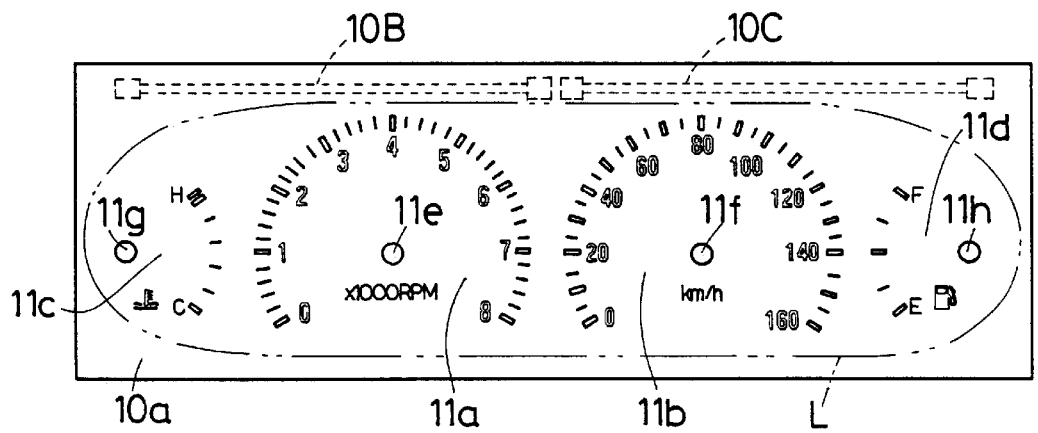
FIG. 5 is a front view illustrating a second variation of the first embodiment.
Figure 6:
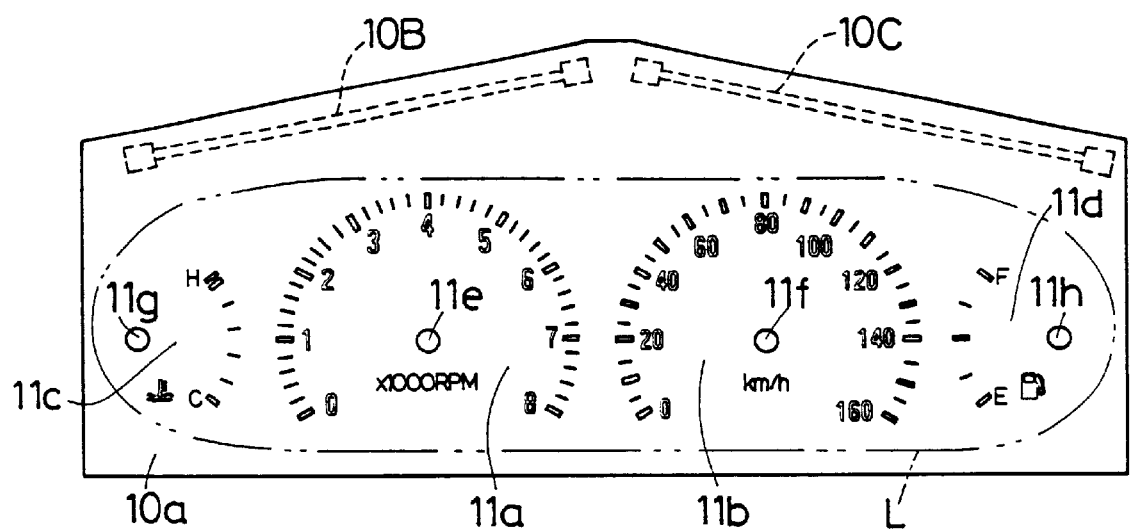
FIG. 6 is a front view illustrating a partial variation of the firs variation.

FIG. 5 illustrates a second variation of the first embodiment. A pair of cold cathode fluorescent lamps 10B and 10C are used in this variation instead of the single lamp 10b of the first embodiment. The lamp 10B illuminates the patterned trans-illuminous portions 11a and 11c, and the lamp 10C illuminates the patterned trans-illuminous portions 11b and 11d. Other portions are the same as the first embodiment. If the dial plate 10a has a triangular upper portion as shown in FIG. 6, the cold cathode fluorescent lamp 1B and 10C are disposed along the sides of the triangular portion.

Figure 7:
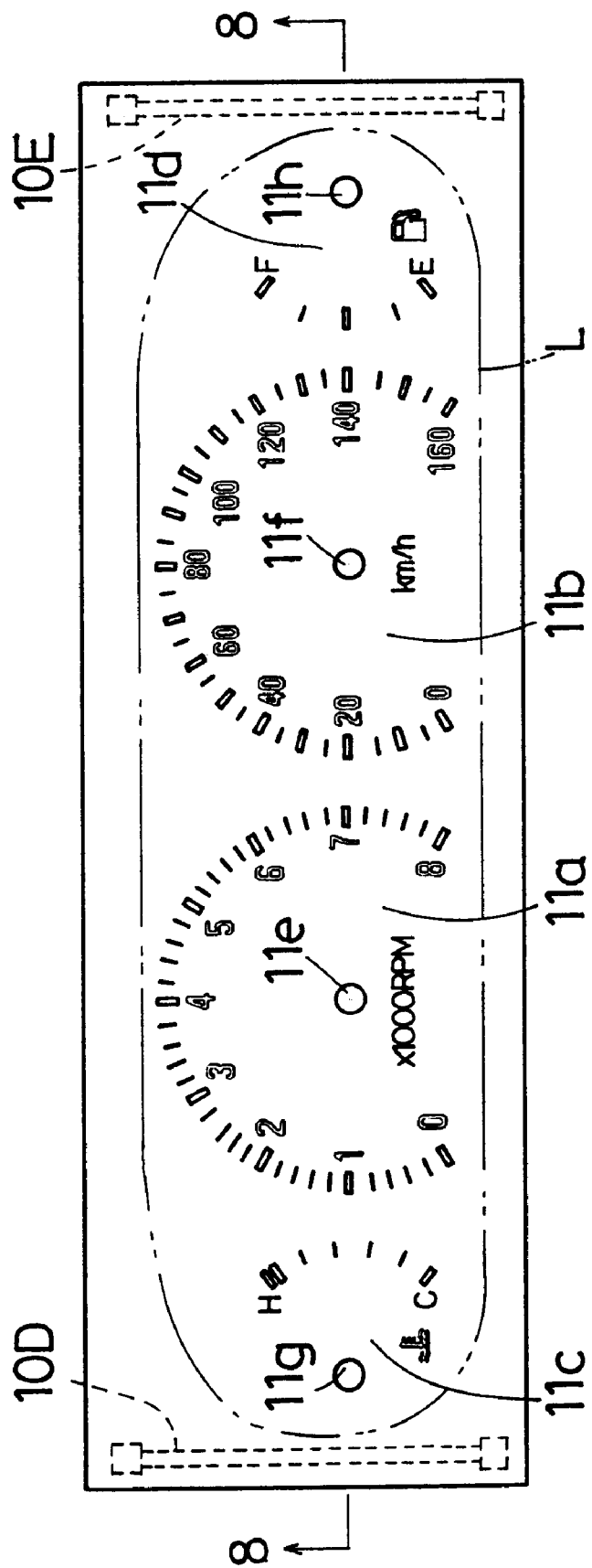
FIG. 7 is a front view illustrating a third variation of the first embodiment.
Figure 8:
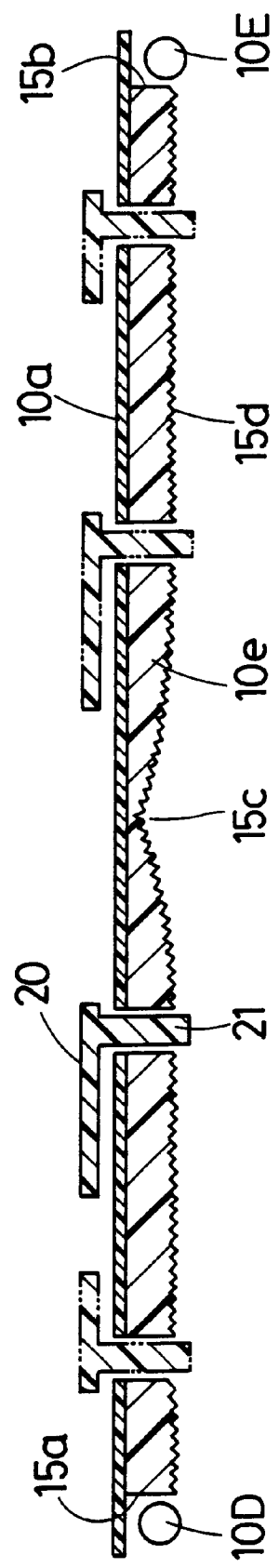
FIG. 8 is a cross-sectional view cut along a line indicated by 8—8 in FIG. 7.

FIG. 7 and FIG. 8 illustrate a third variation of the first embodiment. A pair of cold cathode fluorescent lamps 10D and 10E are disposed at both sides of the dial plate 10a to sandwich the patterned trans-illuminous portions 11c, 11a, 11b and 11d. The left side surface of the light conducting plate 10e faces closely to the fluorescent lamp 10D and the right side surface thereof faces closely to the lamp 10E. The conducting plate 10e has slopes 15c gradually inclining from both sides of a longitudinally central portion of the light conducting plate 10e and forming a shallow V-shaped valley, and a frosted back surface as shown in FIG. 8.

The light emitted from the cold cathode fluorescent lamp 10D enters the light conducting plate 10e from the left side surface 15a, and is guided by the left slopes, reflected and diffused by the frosted surface 15d and enters the patterned trans-illuminous portions 11a and 11c. The light emitted from the cold cathode fluorescent lamp 10E enters the light conducting plate 10e from the right side surface 15b, and is guided by the right slope, reflected and diffused by the frosted surface 15d and enters the patterned trans-illuminous portions 11b and 11d. Other portions are the same as the first embodiment.

The light conducting plate 10e of the third variation can be divided into two sections along the valley to simplify manufacture of the plate 10e. One cold cathode fluorescent lamp can be omitted in this case if one of the lamps 10D and 10E is placed between the two sections of the light conducting plate 10e and if the side surfaces 15a and 15b of the plate sections are disposed to face the lamp closely.

Figure 9:
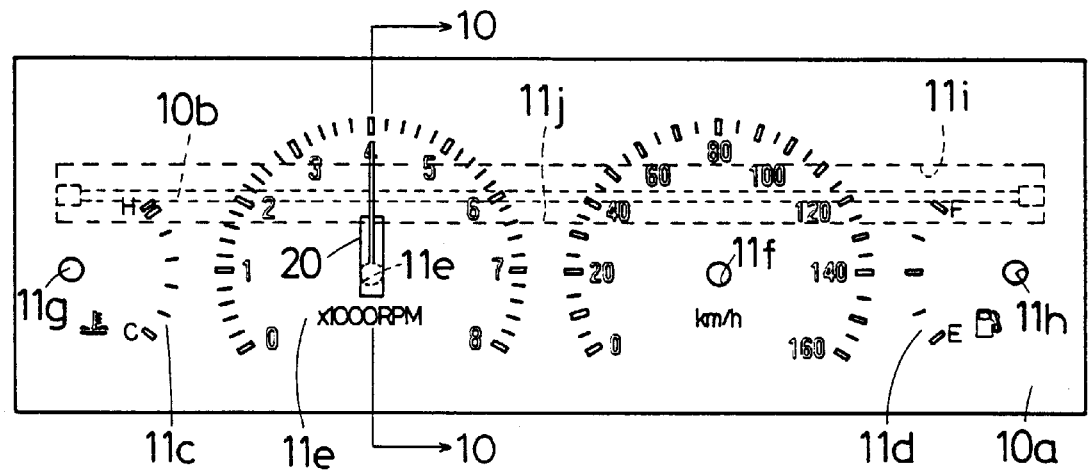
FIG. 9 is a front view illustrating a fourth variation of the first embodiment.
Figure 10:
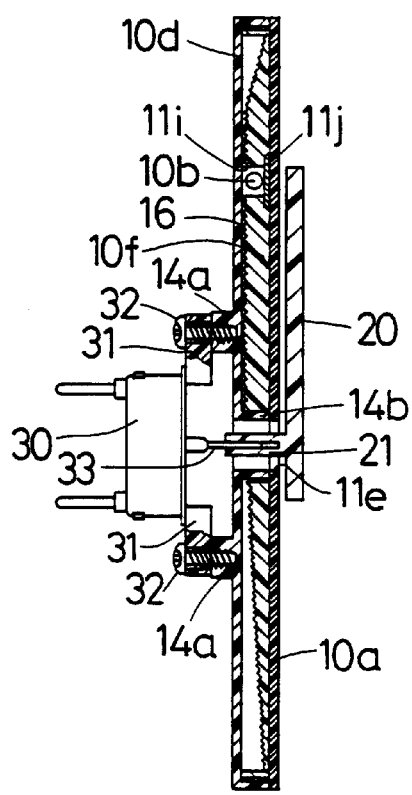
FIG. 10 is a cross-sectional view cut along a line indicated by 10—10 in FIG. 9.

FIG. 9 and FIG. 10 illustrate a fourth variation of the first embodiment. A light conducting plate 10f is fixed to the back of the dial plate 10a. The light conducting plate 10f has a longitudinal groove 11i for accommodating the cold cathode fluorescent lamp 10b. The longitudinal groove 11i is located between the though holes 11e, 11f, 11g and 11h and the upper side of the dial plate.

An open end of the groove 11i on the dial plate side is closed by a light diffusing plate 11j and the cold cathode fluorescent lamp 10b is disposed in the groove 11i. The light diffusing plate 11j is coated with milky white paint mixed with glass beads. The light conducting plate 10f has slopes inclining from the groove 11i to the sides of the back of the dial plate 10a and has frosted back surface 16. Other portions are the same as the first embodiment.

In the above variation, since the diffusing plate 11j reflects and diffuses the direct light of the fluorescent lamp 10b, the difference in the brightness between the diffusing plate 11j and other portions can be reduced.

Since distance between the fluorescent lamp 10b and the patterned trans-illuminous portions is short, the brightness of the dial plate increases. The light conducting plate 10f can be divided into two sections along the groove 11i in order to make the conducting plate 10f easier to manufacture.

Figure 11A:
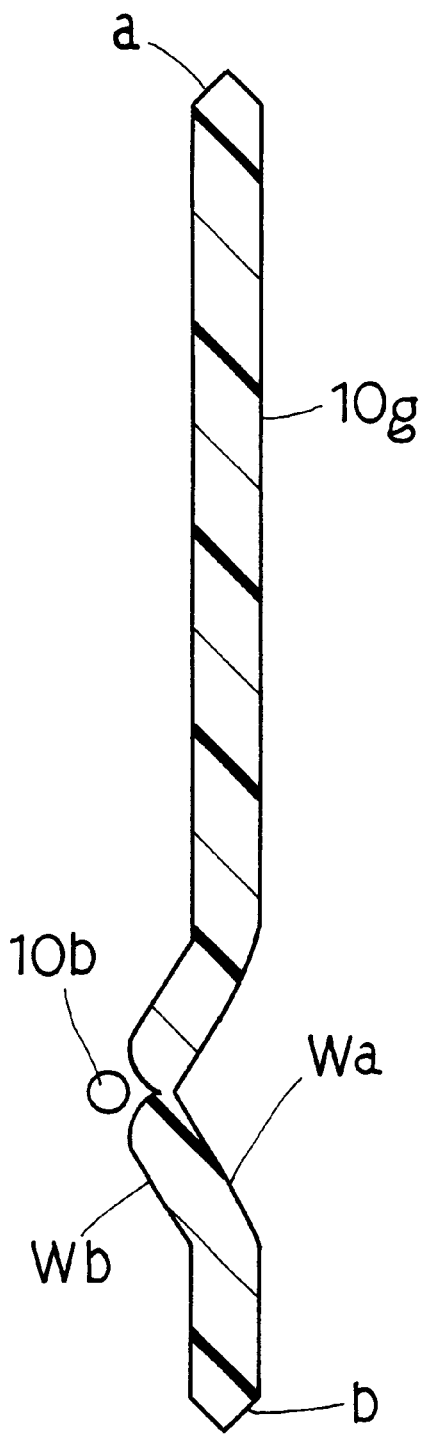
FIG. 11A and FIG. 11B are cross-sectional side views illustrating other partial variations of the fourth variation.

The light conducting plate 10f can be replaced by a light conducting plate 10g which has a V-shaped bend with a reflecting surface Wa, a light incident surface Wb and a grooved ridge portion to face the cold cathode fluorescent lamp 10b as shown in FIG. 11A. The light emitted by the fluorescent lamp 10b enters the light conducting plate 10g from the grooved ridge portion and is reflected by the reflecting surface Wa and, thereafter, by both surfaces repeatedly in the total reflection manner until it reaches V-shaped opposite ends a and b of the conducting plate 10g.

Since the V-shaped bend is formed on the conducting plate 10g, the brightness of the portion near the fluorescent lamp 10b can be reduced as compared to the conducting plate 10a shown in FIG. 10. The light in the conducting plate 10g can be focused on a desired portion by changing the shape of the grooved ridge.

Figure 11B:
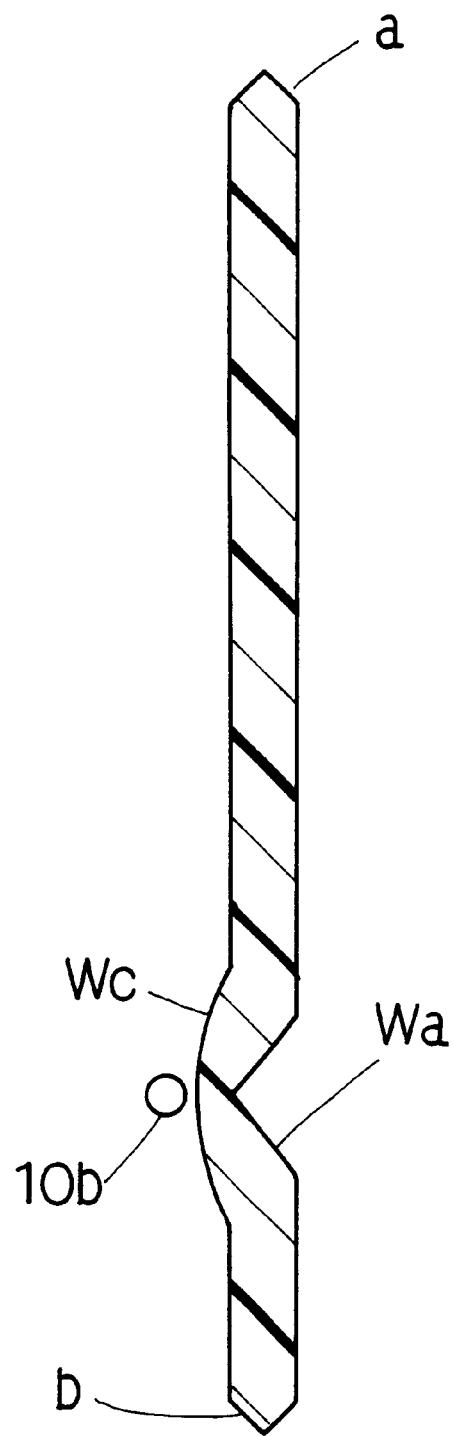

The light incident surface Wb can be replaced by a partially cylindrical light incident surface Wc shown in FIG. 11B. At least one of the reflecting surfaces Wa and Wc can be frosted. If the surface Wc is frosted, the light beams emitted from the lamp 10b are scattered by the surface Wc in the light conducting plate 10g. On the other hand, if the surface Wa is frosted, a portion of the light emitted from the lamp 10b is diffused by the surface Wa and directed to the head portion. Thus difference in brightness between a portion right under the lamp and other portions is reduced.

Figures 12A, 12B, 12C:
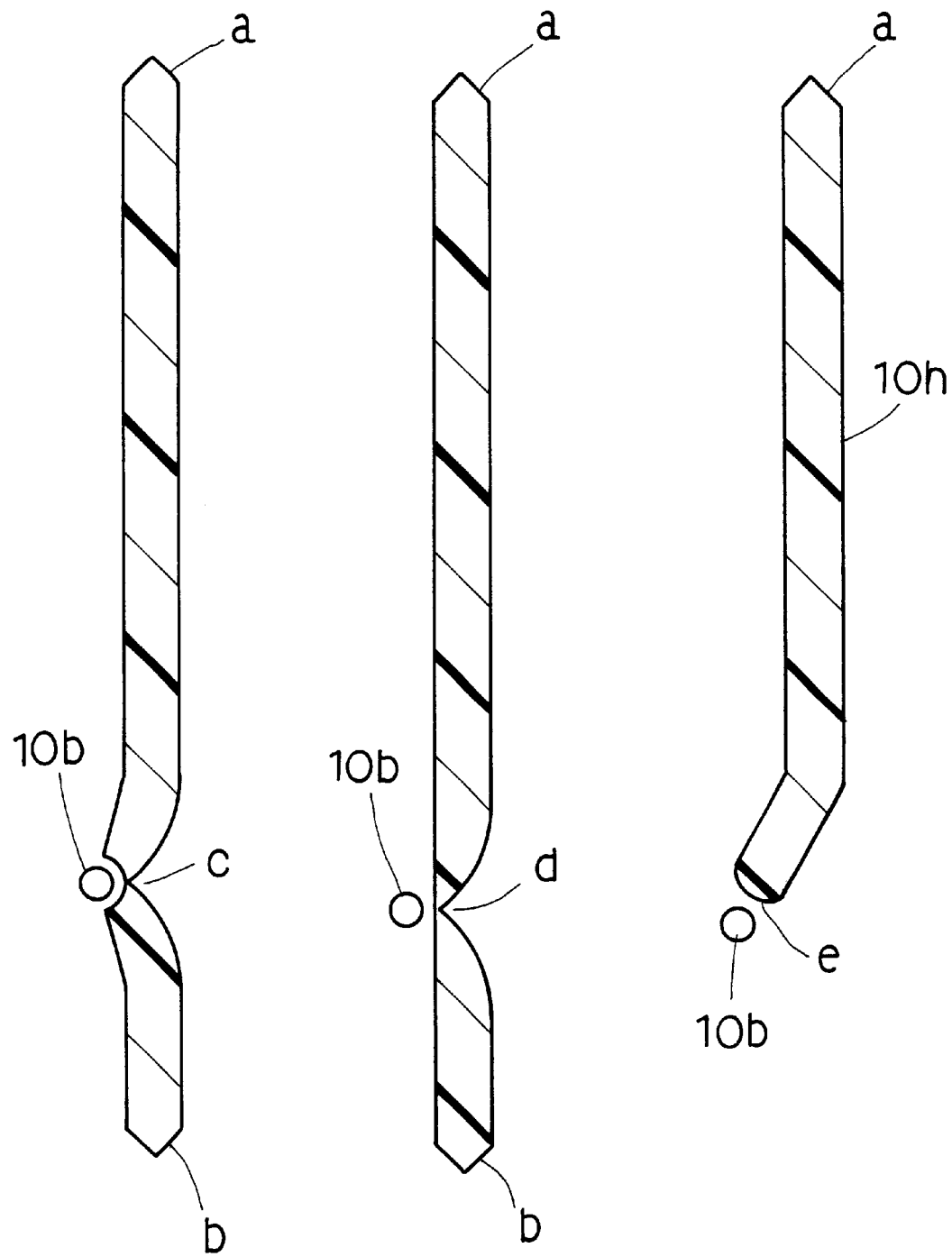
FIG. 12A, FIG. 12B and FIG. 12C are cross-sectional side views illustrating other partial variations of the fourth variation.
Figure 13:
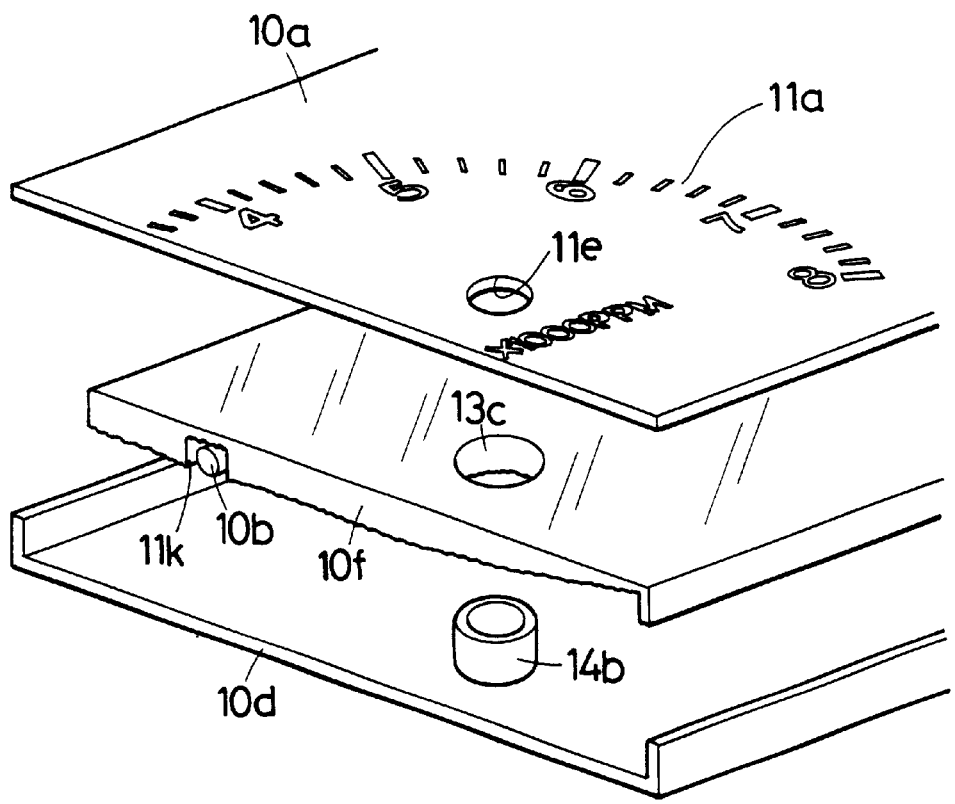
FIG. 13 is an exploded view illustrating main portions of another partial variation of the fourth variation.

The V-shaped bend of the light conducting plate 10g can be replaced with portions indicated by reference character c or d illustrated in FIG. 12A or FIG. 12B. The light conducting plate 10g is also replaceable to a light conducting plate 10h which has a bent end e to face the cold cathode fluorescent lamp 10b as shown in FIG. 12C. The groove 11i (in FIG. 10) can be replaced with a groove 11k which has a frosted bottom portion without changing the main function as shown in FIG. 13.

Figure 14:
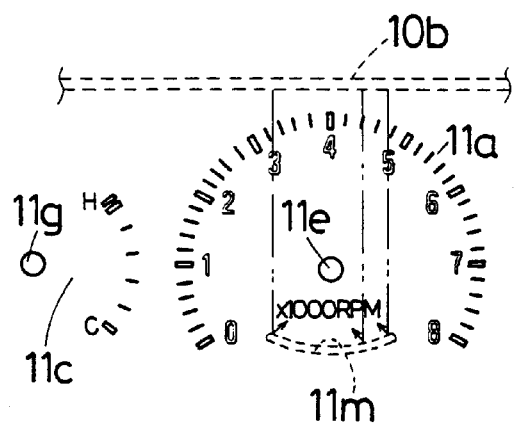
FIG. 14 is a front view illustrating a main portion of a fifth variation of the first embodiment.
Figure 15:
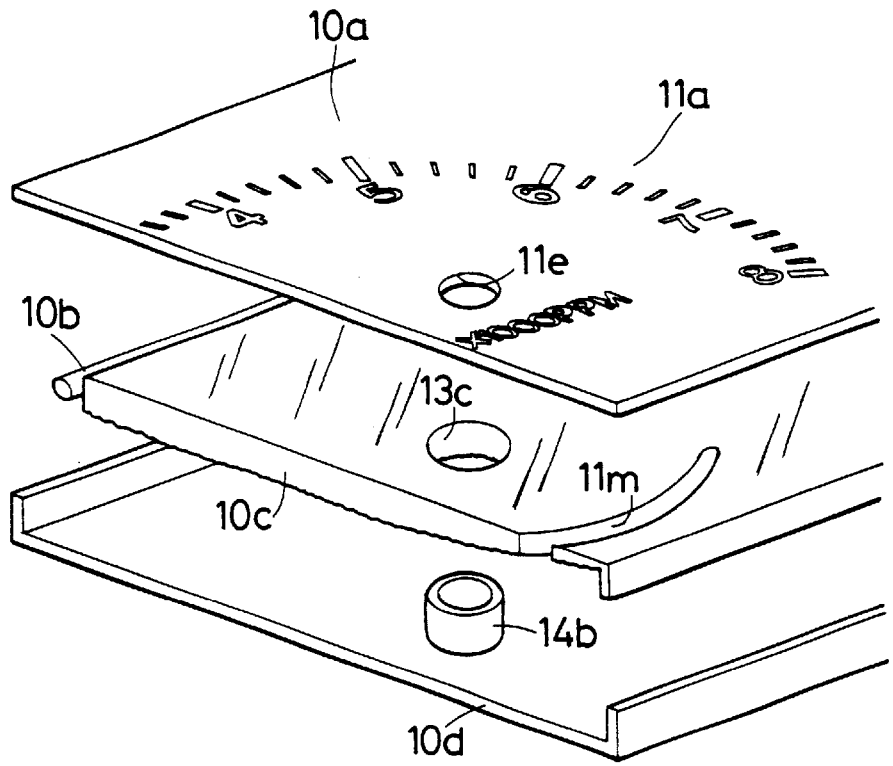
FIG. 15 is an exploded view illustrating main portions of a dial plate, a light conducting and a holder of the first embodiment shown in FIG. 14.

FIG. 14 and FIG. 15 illustrate a fifth variation of the first embodiment. Arc-shaped slits 11m are formed coaxially with the through holes 11e, 11f, 11g and 11h of the dial plate 10a at a side opposite the fluorescent lamp 10b.

When the light of the fluorescent lamp 10b enters the light conducting plate 10c and comes to an internal wall of the arc-shaped slit 11m, it is reflected toward the through hole (e.g. 13c). Thus, the light is focused on the through hole 13c and the patterned trans-illuminous portion (e.g. 11a) is illuminated sufficiently.

Figure 16:
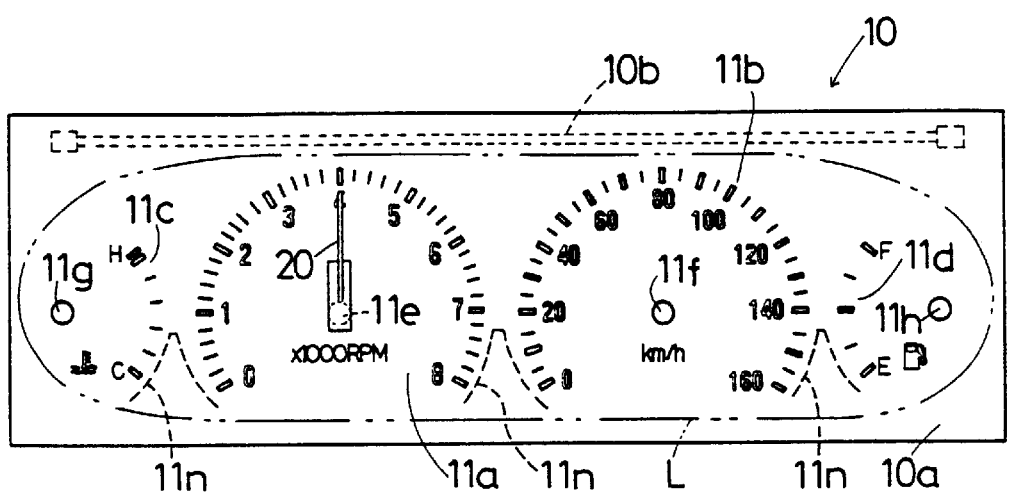
FIG. 16 is a front view illustrating a main portion of a variation of the fifth variation.
Figure 17:
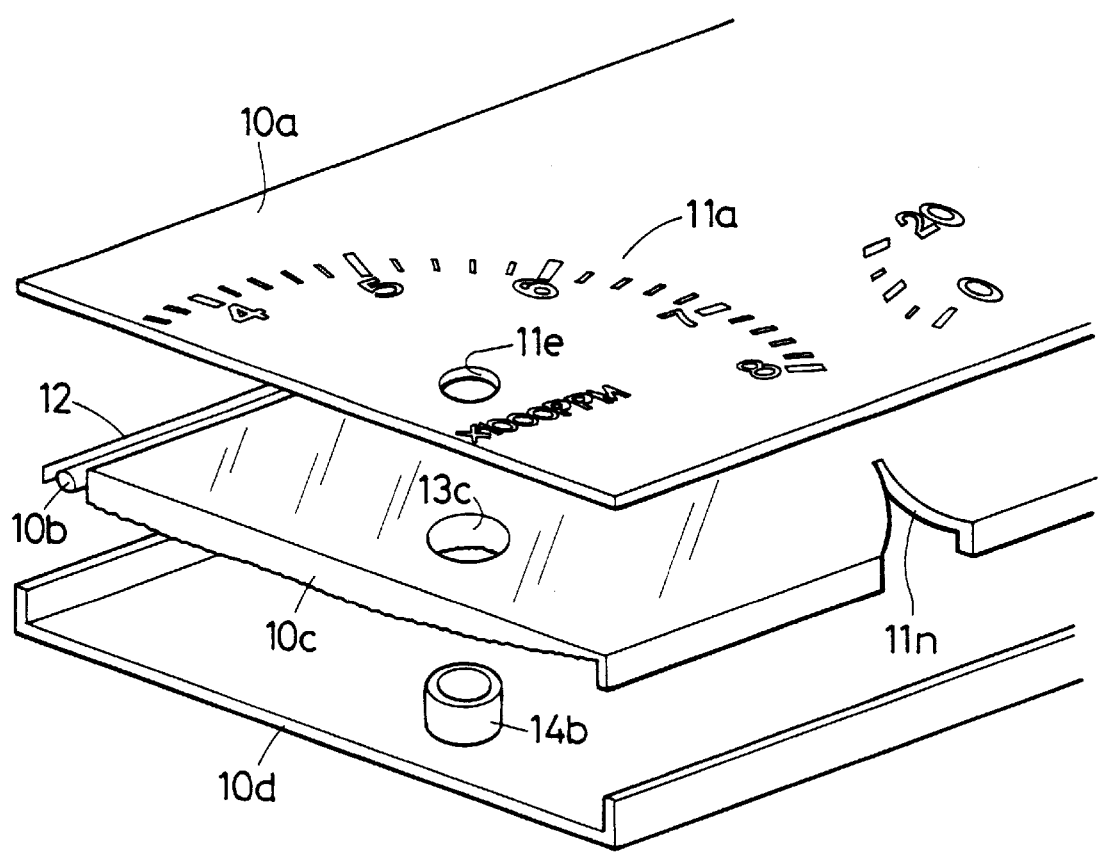
FIG. 17 is an exploded view illustrating main portions of a dial plate, a light conducting plate and a holder of the first embodiment shown in FIG. 16.

Instead of the above structure, V-shaped cut sections 11n having arc-shaped sides which are respectively coaxial with the through holes (e.g. 13c) are formed at portions opposite the lamp 10b of the dial plate 10a between the patterned trans-illuminous portions respectively as shown in FIG. 16 and FIG. 17, achieving substantially the same effect as the above variation.

Figure 18:
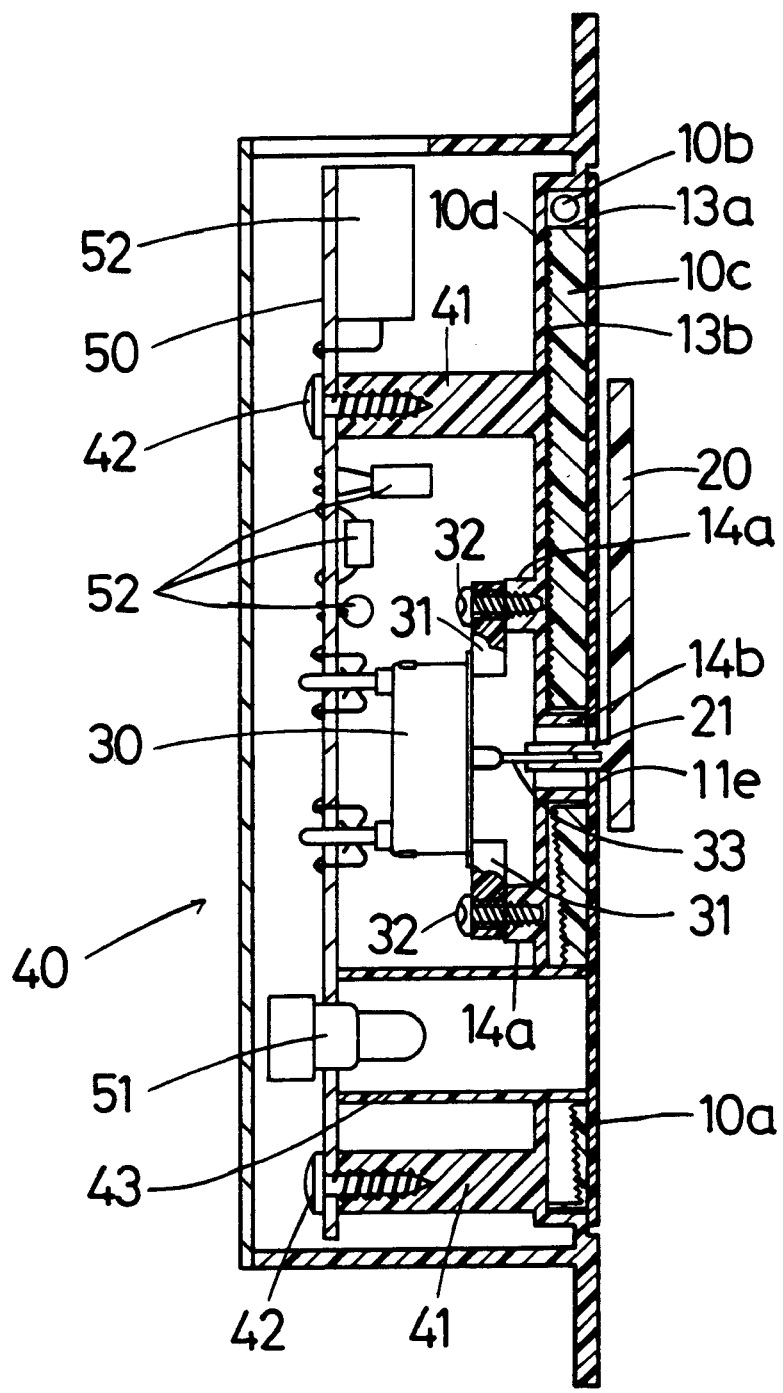
FIG. 18 is a front view illustrating a sixth variation of the first embodiment.

FIG. 18 illustrates a sixth variation of the first embodiment.

A casing 40 has two columns 41 extending from the bottom of the holder 10d and support a printed circuit board 50 by screws 42. The casing 40 has a cylindrical member 43 which accommodates a warning lump 51. A bottom end of the cylindrical member 43 faces the back of the dial plate 10a directly. When the warning lamp is turned on, a turn signal indicator pattern (not shown) formed on the dial plate 10a is illuminated.

Since the printed circuit board 50 is housed in an otherwise dead space under the dial plate 10a, the casing can be made compact. Since the printed circuit board 50 is disposed at a certain distance from the fluorescent lamp 10b, circuit elements or parts 52 on the printed circuit board are not affected by the heat generated by the lamp 10b.

A discharge lamp-type self-luminous indicator or an LED-built-in indicator can be used instead of the indicator 20 of first embodiment.

A fluorescent pointer member (not shown) illuminated by a black light lamp fixed on an upper portion of the dial plate 10a can be used in replacement with the indicator 20 of the first embodiment.

Figure 19:
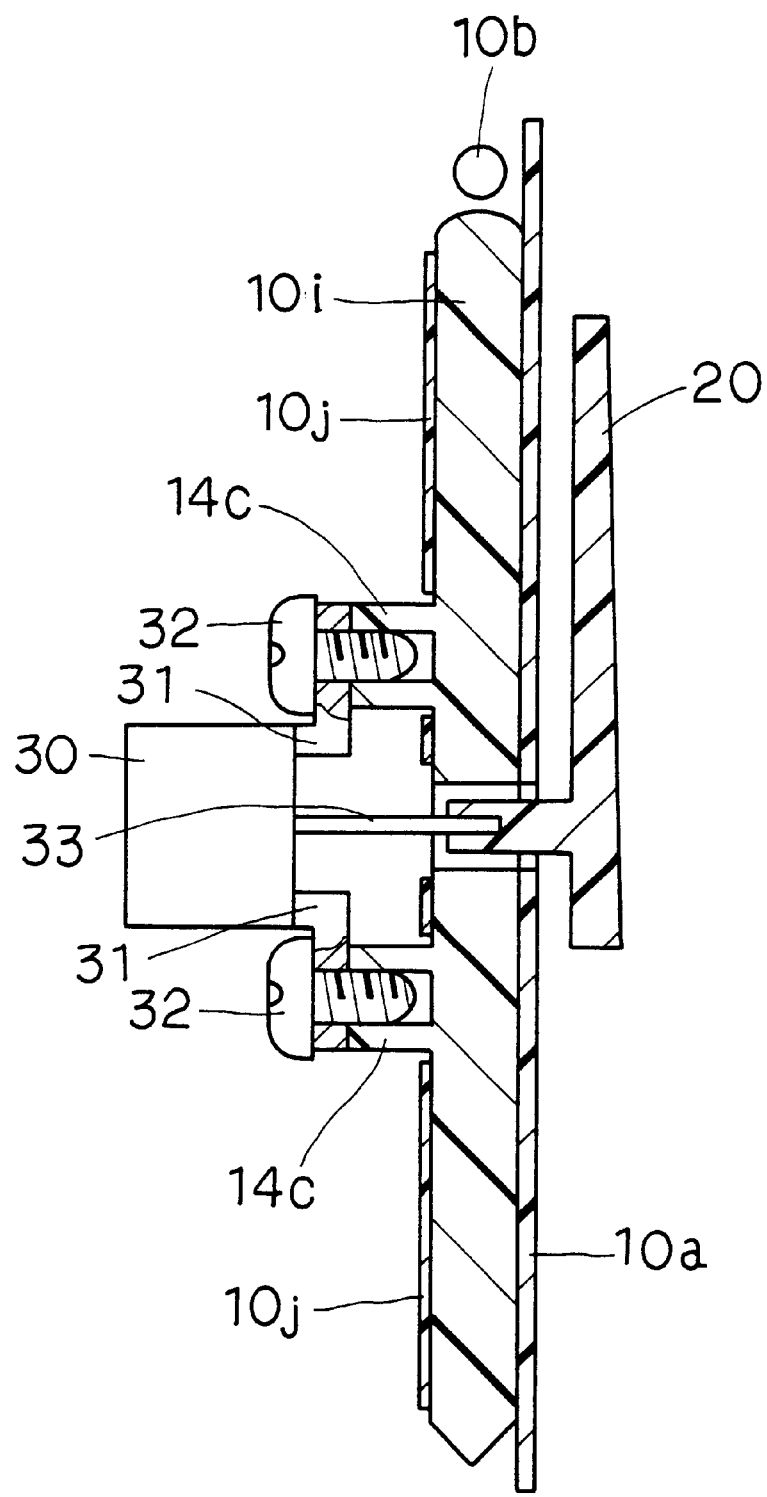
FIG. 19 is a front view illustrating a seventh variation of the first embodiment.

FIG. 19 illustrates a seventh variation of the first embodiment. The light conducting plate 10c and the holder 10b of the first embodiment are replaced with a light conducting plate 10i and an annular reflecting plate 10j.

The light conducting plate 10j has a pair of columnar members to which flanges 31 of the driving unit 30 are bolted.

The reflecting plate 10j is formed on the back of the light conducting plate 10i by insert-molding, hot stamping or printing to reflect the illumination light toward the dial plate 10a effectively.

In order to equalize the illumination of the dial plate, a large number of small black points can be printed on the reflecting plate 10j. The density of the black point increases to reduce the reflectivity as the distance from the fluorescent lamp becomes shorter.

Instead of reducing the density of the black points at portions remote from the lamp, a number of white or bright colored point can be printed to increase the reflection therefrom.

(Second Embodiment)

Figure 20:
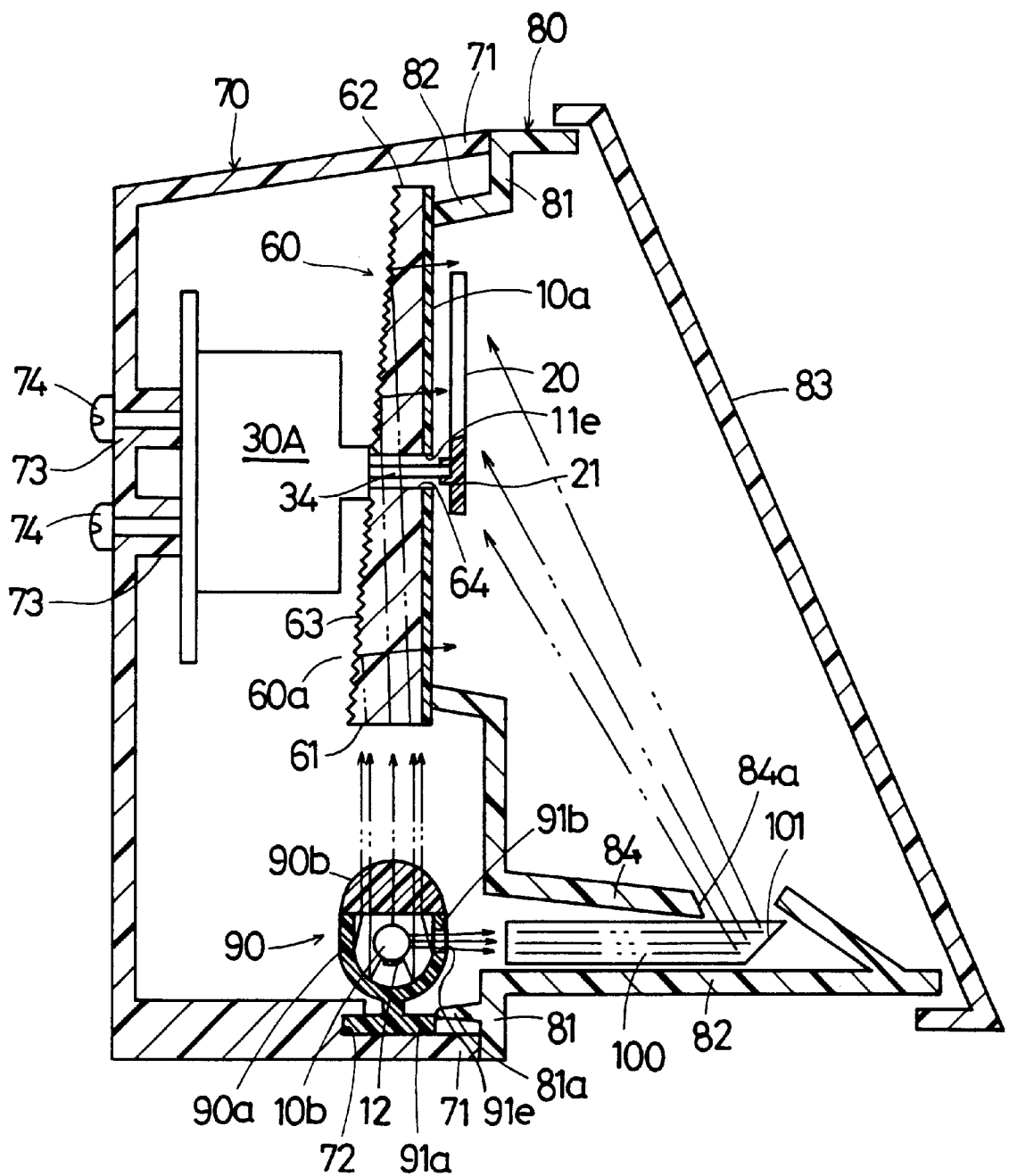
FIG. 20 is a cross-sectional side view illustrating a main portion of an indicating instrument according to a second embodiment of the present invention.
Figure 21:
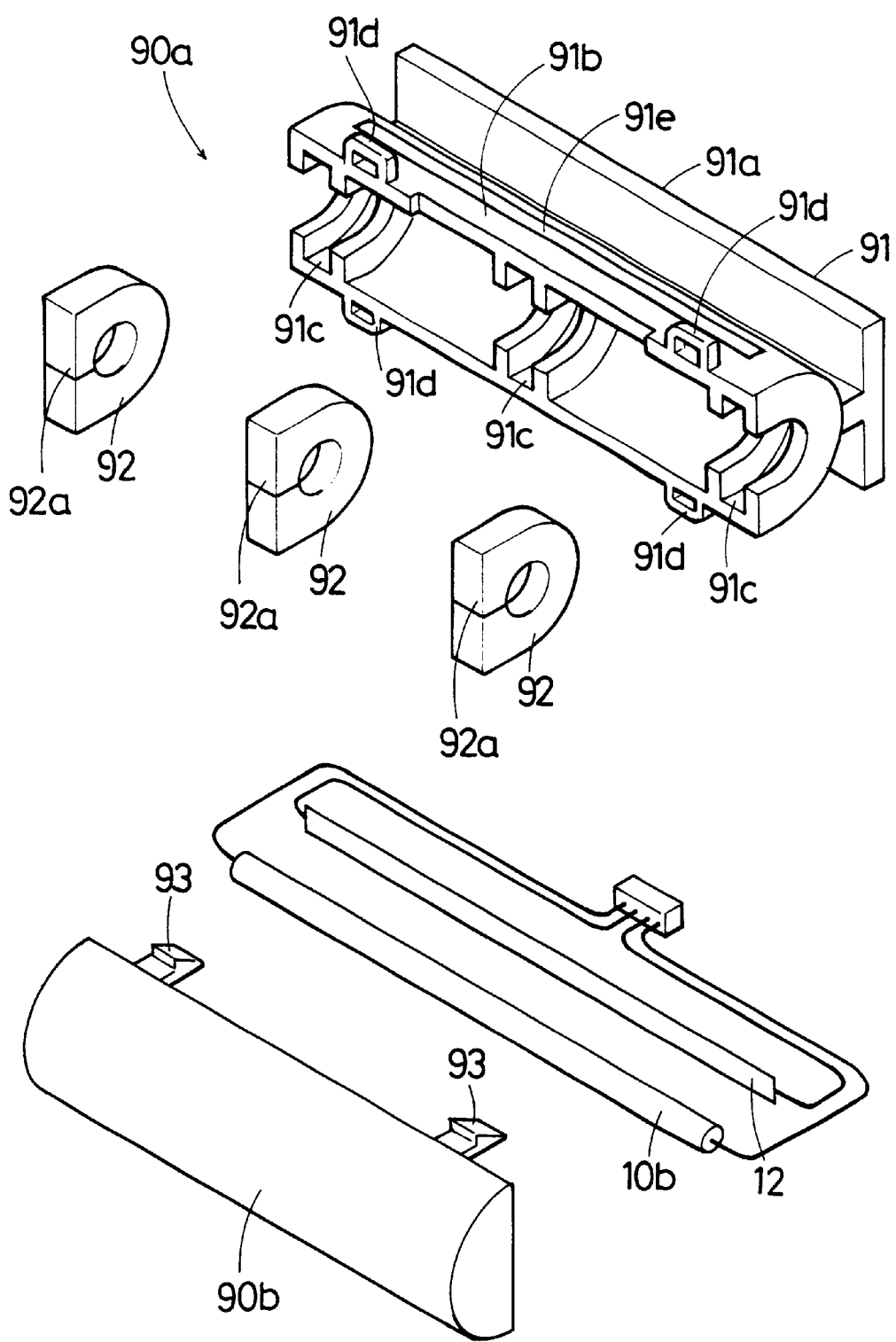
FIG. 21 is an exploded view illustrating a light source unit.

FIG. 20 and FIG. 21 illustrate an indicating instrument for a vehicle according to a second embodiment of the present invention.

The indicating instrument has a dial plate unit 60, which is secured to a casing 70 in an open space 71 via an annular light shield 80 having black painted inner surface, and a light conducting plate 60a on the back of the dial plate 10a.

The annular light shield 80 is composed of an annular flange 81, an inner annular wall 82 extending inside the casing 70 and outer annular wall 82' extending outward from the annular flange 81. An outer open end of the outer annular wall 82' has a transparent acrylic resinous front panel 83.

The dial plate 10a is fixed to an open end of the inner annular wall 82 so that the patterned trans-illuminous portion (e.g. 11a) of the dial plate 10a is exposed to the outside through the front panel 83.

The light conducting plate 60a is made of the same material as the light conducting plate 10c of the first embodiment. The light conducting plate 60a has a sloped and saw-toothed back surface approaching the back of the dial plate 10a from a bottom surface 61 to an upper surface 62 so as to equalize the illumination of the dial plate 10a.

A light source unit 90 is disposed right under the dial plate unit 60 and fixed to the open end portion 71 of the casing 70 to face the bottom surface 61 of the light conducting plate 60a. The light source unit 90 has a reflector 90a, a convex lens 90b and the cold cathode fluorescent lamp 10b and the heater 12, which are described before.

The reflector 90a has the same longitudinal length as the fluorescent lamp 10b and is composed of a reflecting member 91 made of white resinous material, such as polypropylene, and three adapters 92 which are made of transparent elastic material such as polyurethane rubber. The reflecting member 91 is composed of a support 91a which has a T-shaped cross section secured to a hollow portion 72 and a generally a half cylindrical reflecting portion 91b.

The reflecting portion 91b opens toward the bottom surface 61 of light conducting plate 60a and has grooves 91c formed on its surfaces to receive the adapters 92 therein and fixing frames 91d formed on both side thereof. The cold cathode fluorescent lamp 10b is fitted into the adapters 92 through slits 92a which open wide when the lamp 10b is inserted therein.

The convex lens 90b is a half cylindrical lens made of transparent glass or resinous material that has a flat light incident surface fixed to the open end of the reflecting portion 91b and hook members 93 formed on both sides thereof to engage the fixing frames 91d of the reflecting portion 91b.

Figure 22:
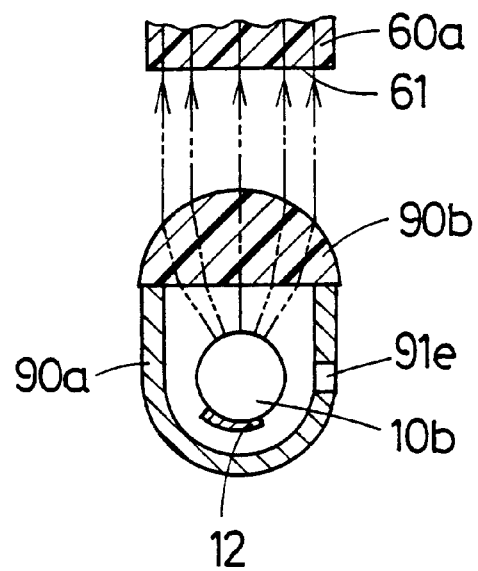
FIG. 22 is a schematic view illustrating optical paths of the light source unit.

When the light source 90 is assembled, the cold cathode fluorescent lamp 10b and the heater 12 are inserted into the adapters 92. Then the adapters 92 with the lamp 10b and the heater 12 in a unit are inserted into the grooves 91c. Thereafter, the hook members 93 of convex lens 90b are fitted to the fixing frames 91d so that the incident surface of the lens 90b abuts on the open end surface of the reflecting portion 91b. As a result, the light of the fluorescent lamp 10b is reflected by the reflecting portion 91b, refracted by the convex lens 90b and enters the bottom surface 61 of the light conducting plate 60a as the parallel light as shown in FIG. 22. The T-shaped support 91a is fixed to the hollow portion 72 of the casing 70 and retained by a tongue member 81a which extends from the annular flange 81. Since the adapters 92 are transparent, the light reflected by the reflecting member 91 is utilized effectively.

A separate light conducting member or prism 100 made of transparent optical-resinous-material, such as acrylic resin or polycarbonate, is disposed at a front bottom portion of the casing 70 between an inner-front light shield member 84 and the outer light shield member 82 so that a part of the light of the fluorescent lamp 10b is introduced to the prism 100 and illuminates the indicator 20 through a window 84a of the inner front shield member 84 as described later. For this purpose, the prism 100 has a beveled reflecting surface 101 facing the indicator 20. The opposite end of the prism 100 faces a slit 91e formed longitudinally in the reflecting portion 91b of the reflector 90a.

The indicator instrument has a driving unit 30A housed in the casing 70 and secured by screws 74 to supports 73 formed integrally with the casing. An indicator shaft 34 of the driving unit 30A is inserted in a through hole 64 of the light conducting plate 60 and the through hole 11e of the dial plate 10a and fitted to the boss 21 of the indicator 20.

Other indicators and driving units for the speedometer, the cooling water temperature gauge and the fuel gauge are substantially the same as the indicator 20 and the driving unit 30A and are fixed to the patterned trans-illuminous portions 11b, 11c and 11d of the dial plate 10a respectively.

Since a part of the light emitted from the cold cathode fluorescent lamp 10b is utilized to illuminate the indicator 20, an expensive self-luminous indicator or an extra cold cathode fluorescent lamp for illuminating the indicator 20 is not necessary to the above embodiment. As a result, an inexpensive highly illuminated indicator instrument can be provided.

Figure 23:
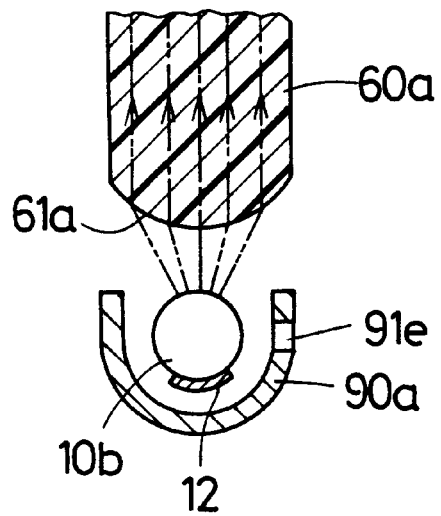
FIG. 23 is a schematic view illustrating a partial variation of the light source unit illustrated in FIG. 20.

The convex lens 90b of the second embodiment can be omitted if the flat bottom surface 61 of the light conducting plate 60a is changed to a half cylindrical convex surface 61a to form the incident light into parallel light as illustrated in FIG. 23.

If the transparent front panel 83 is replaced with a smoked panel having a transparency less than 30%, the indicator instrument can have a function so called "black face" through which the dial plate or other inside member is not visible when the lamp is turned off, that is, when the key switch is turned off.

If the light conducting plate 60a is colored with a color different from the prism 100, the illumination color of the dial plate can be made different from the illumination color of the indicator 20.

(Third Embodiment)

Figure 24:
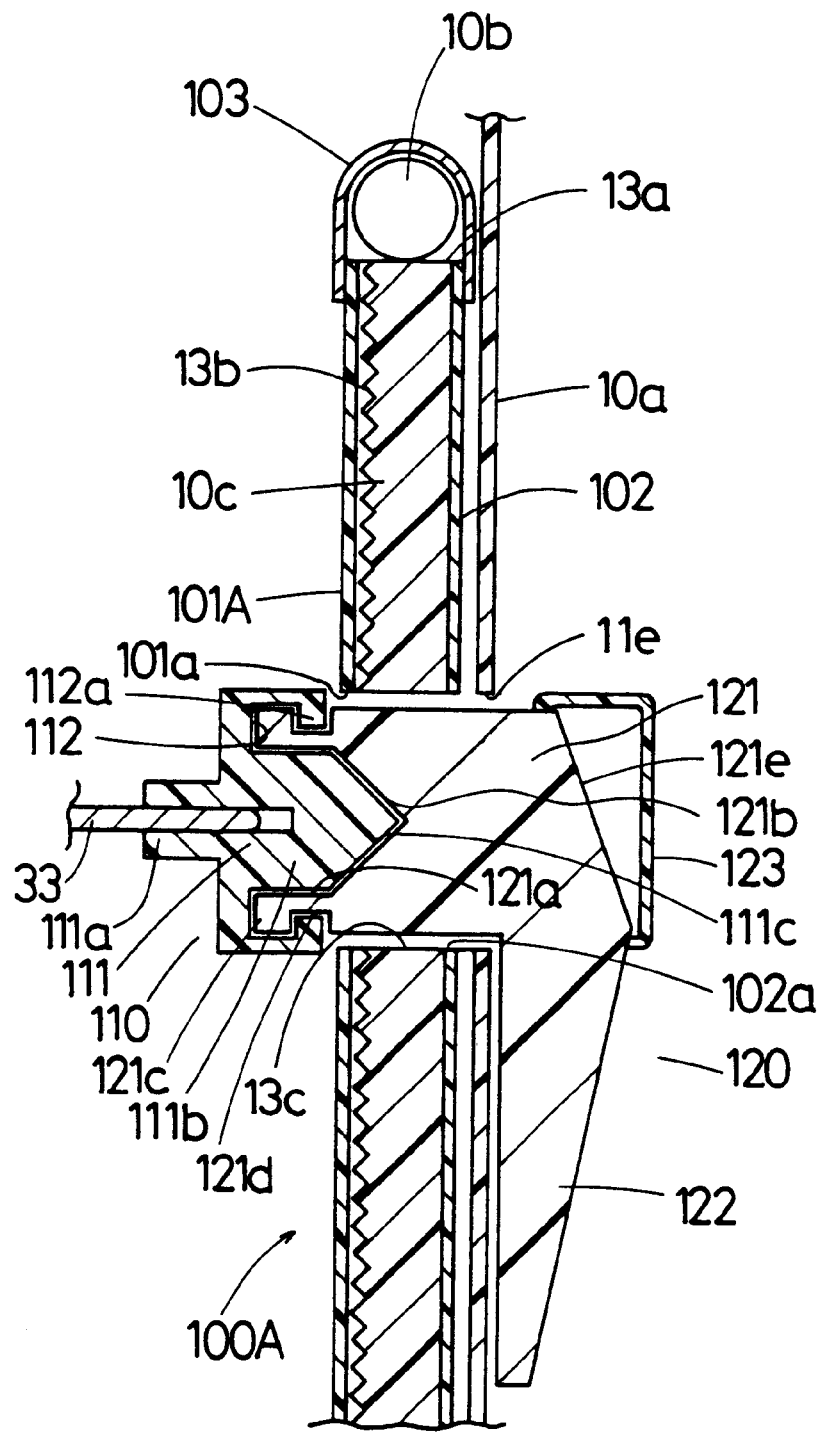
FIG. 24 is a cross-sectional side view illustrating a main portion of an indicating instrument according to a third embodiment of the present invention.

FIG. 24 illustrates an indicating instrument for a vehicle according to a third embodiment.

The dial plate unit 10 and the indicator 20 of the first embodiment are replaced with a dial plate unit 100A, adapter 110 and an luminous indicator 120. The dial plate unit 100A includes a flat reflector 101A, a light diffusing plate 102 and a U-curved gutter-like reflector 103 as well as the dial plate 10a, the cold cathode fluorescent lamp 10b and the light conducting plate 10c.

The flat reflector 101A is attached on the back of the light conducting plate 10c to reflect the light otherwise going out from the light conducting plate 10c. The light diffusing plate 102 is attached on the front surface of the light conducting plate 10c to diffuse the light entering the dial plate 10a from the light conducting plate 10c.

The U-curved reflector 103 is fixed to an upper end of the light conducting plate 10a so that the reflecting surface thereof faces the upper end surface 13a of the light conducting plate. The cold cathode fluorescent lamp 10b is disposed in the U-curved reflector so that the light emitted from the lamp 10b is reflected and enters the light conducting plate 10c from the upper end surface 13a. The dial plate 10a and the light conducting plate 10c are fixed together in a common manner.

The driving shaft 33 is connected to the driving unit 30 which is described before. The adapter 110 molded from the same material as the light conducting plate 10c which is described before and has a center column 111 and an annular grip member 112 as shown in FIG. 24. The center column 111 is composed of a boss portion 111a connected to the driving shaft 33 and a cone-shaped support portion 111b which supports the indicator 120 with the grip member 112 to connect the luminous indicator 120 to the driving shaft 33. For this purpose, the grip portion extends from the center column 111 to form an L-shape in a cross-section having arc-shaped lips 112a extending inward therefrom at an equal interval.

The luminous indicator 120 is a mold of the same material as the light conducting plate 10c and has a columnar support 121, a pointer which extends radially from the columnar support 121, a center hole 121a having a cone-shaped bottom 121b to receive the cone-shaped support portion 111b of the adapter 110, a pair of arc-shaped projections 121c which are formed on the outer periphery of the columnar support 121 to be caught by the grip member 112 of the adapter 110 and an annular groove 121d which receives the lips 112a of the adapter 110. The bevel angle of the cone shaped bottom of the luminous indicator 120 and the cone shaped support portion 111b of the adapter 110 is about 45 degrees. On the base portion of the pointer which is opposite the center hole 121a, a beveled reflecting surface 121e is formed so that the light in the columnar support 121 is reflected toward the pointer 122. The beveled reflecting surface 121e can be replaced with a curved surface or a stepped surface. The outer surface of the indicator 120 is frosted or covered with light diffusing coating so that the indicator can be illuminated uniformly. A reference numeral 123 indicates a cap fixed to the pointer to prevent the light from leaking from the pointer.

When the luminous indicator 120 is connected to the adapter 110, the columnar support 121 is put into the through hole 13c of the light conducting plate 10c through the holes 11e and 102a of the dial plate 10a and the light diffusing plate 102. Then the cone-shaped support portion 111 of the adapter 110 is fitted into the center hole of the columnar support 121 of the indicator 120, and the projections 121c are put into the grip member 112 of the adapter 110 through gaps formed between the lips 112a.

Thereafter, the adapter 110 is turned slightly around the columnar support 121 so that the projections 121c are secured between the lips 112a and the bottom portion of the grip member 112.

When the light of the cold cathode fluorescent lamp 10b enters the light conducting plate 10c from the upper surface 13c, it is diffused by the light diffusing plate 102 on its way and guided to the dial plate 10a. Thus, the patterned transilluminous portions of the dial plate 10a are illuminated as described with regard to the first embodiment.

Figure 25:
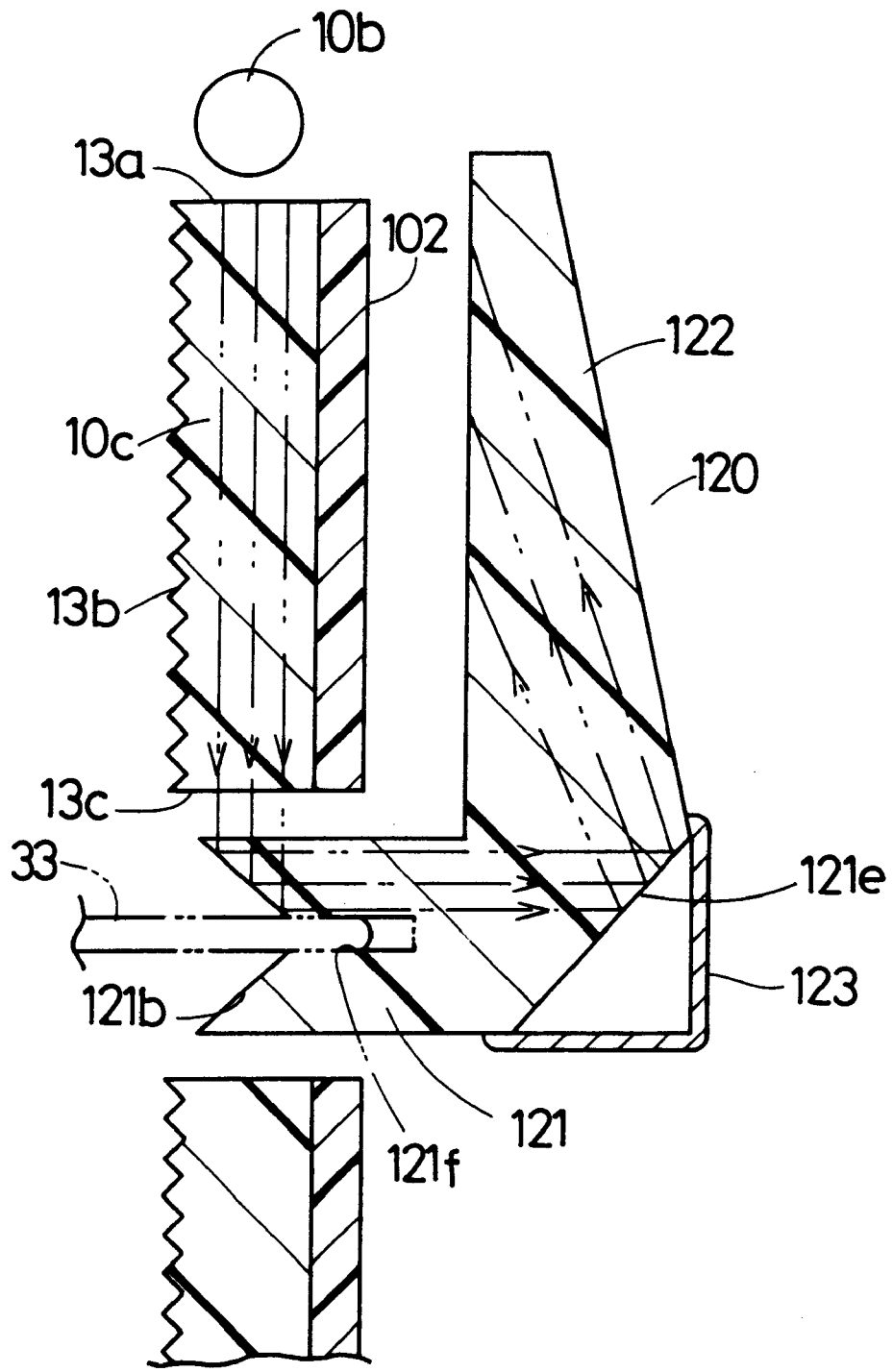
FIG. 25 is an explanatory view illustrating an optical path of a luminous indicator points toward a cold-cathode-fluorescent lump in the indicating instrument according to the third embodiment.

At the same time, a part of the light guided by the light conducting plate 10c enters the indicator 120 from the columnar support 121 as indicated by chain lines illustrated in FIG. 25. The light coming into the indicator 120 is reflected by the cone-shaped bottom 121b toward the beveled reflecting surface 121e, where the light is reflected toward the pointer 122 for illumination. When the pointer 122 points upward as shown by the chain lines in FIG. 25, the light guided along the periphery of the columnar support 121 reaches the head portion of the pointer 122. On the other hand, when the pointer points downward as shown in FIG. 25, the light guided along the center axis of the columnar support 121 reaches the head portion of the pointer 122.

Thus, an additional light emitting element such as an LED or a cold cathode fluorescent lamp, is not necessary to illuminate the indicator.

Since the driving shaft 33 is located outside the through hole 13c of the light conducting plate 10c, the light entering the pointer 122 is guided along the indicator to the head of the pointer without any obstacle. As a result, the illumination of the dial plate 10a and the indicator can be provided without increasing cost.

Figure 26:
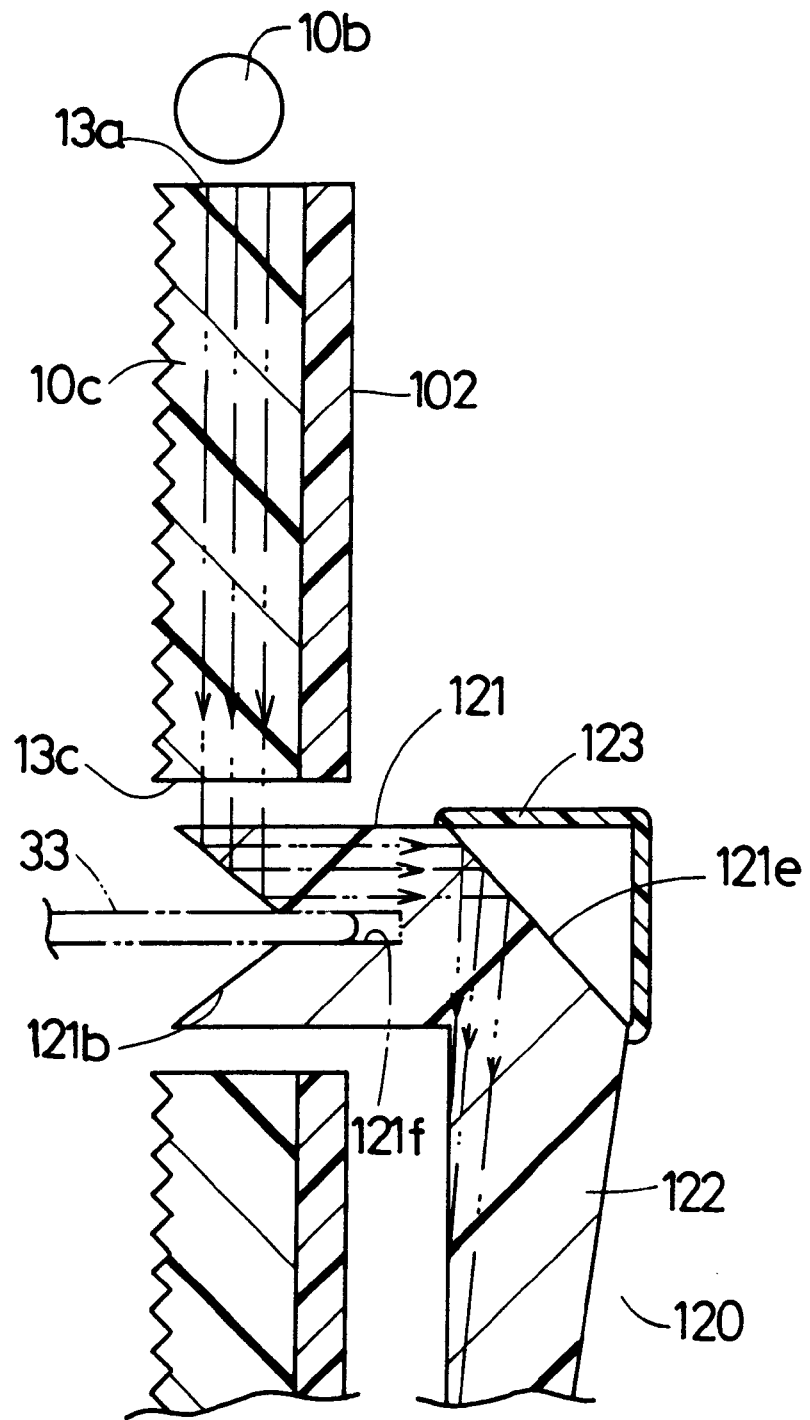
FIG. 26 is an explanatory view illustrating an optical path of a luminous indicator points toward opposite the cold-cathode-fluorescent lump in the indicating instrument according to the third embodiment.

The adapter 110 can be omitted if the driving shaft 33 is directly connected to the columnar support 120 as indicated by chain lines in FIG. 25 and 26.

Figure 27A:
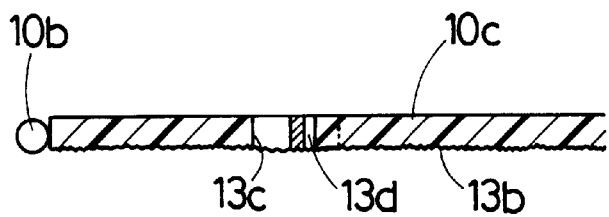
FIG. 27A is a cross-sectional view illustrating a main portion of a variation of the third embodiment cut along a line 27—27 shown in FIG. 27B.
Figure 27B:
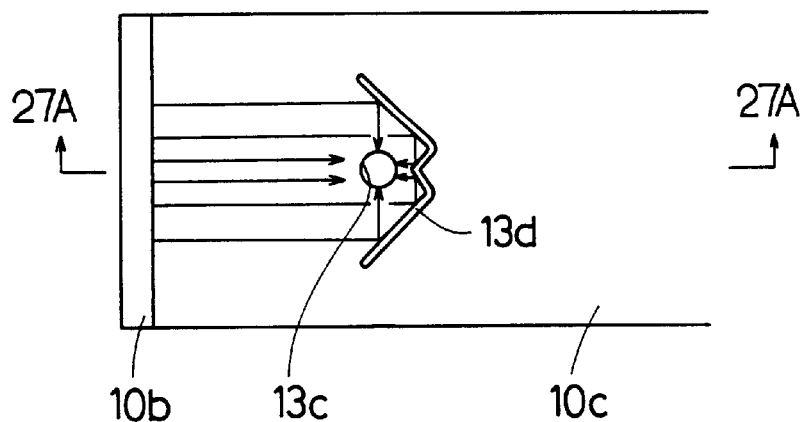
FIG. 27B is a front view thereof.
Figure 28:
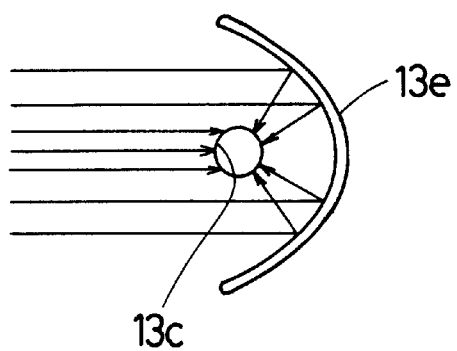
FIG. 28 is a schematic views illustrating other partial variations of the third embodiment.

The illumination of the indicator 120 of the third embodiment can be increased if a W-shaped light reflecting slit 13d is formed in the light conducting plate 10c at the side of the through hole 13c opposite the fluorescent lamp 10b as illustrated in FIG. 27A and FIG. 27B. An additional part of the light from the lamp 10b is reflected by the surface of the W-shaped reflecting slit 13d and guided to the through hole 13c together with the direct light. The W-shaped slit can be replaced with a parabolic slit 13e as illustrated in FIG. 28.

(Fourth Embodiment)

Figure 29:
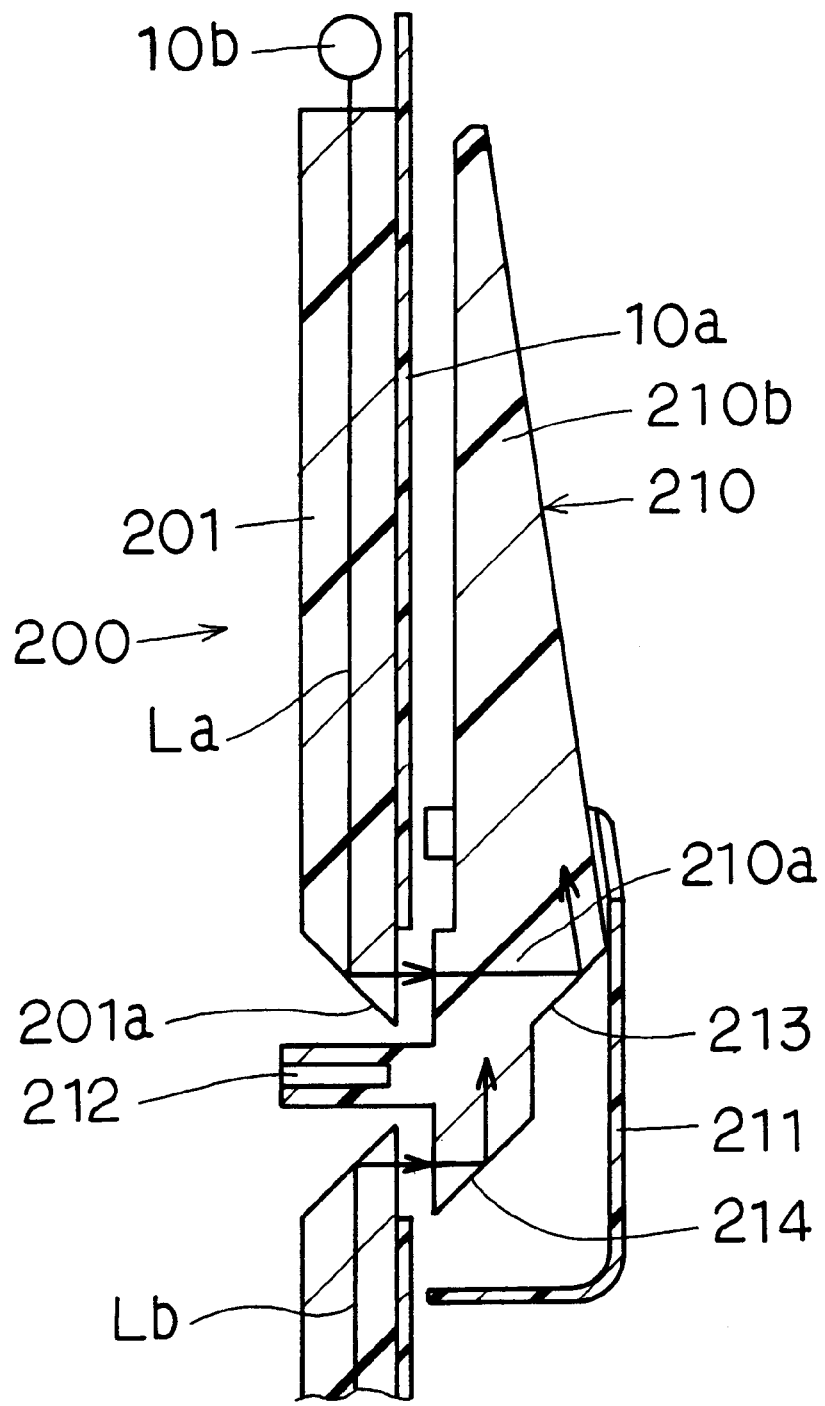
FIG. 29 is a cross-sectional side view illustrating a main portion of an indicating instrument according to a fourth embodiment of the present invention.
Figure 30:
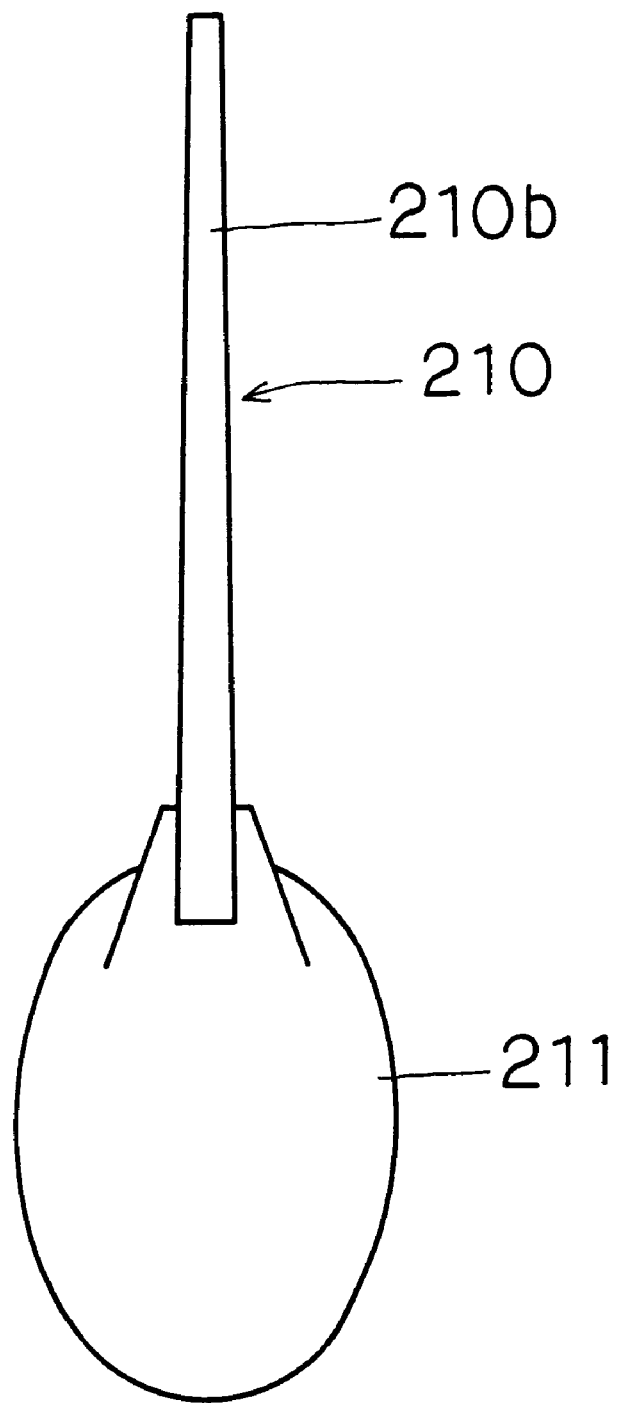
FIG. 30 is a plan view illustrating a luminous indicator illustrated in FIG. 29.

FIG. 29 and FIG. 30 illustrate an indicating instrument for a vehicle according to a fourth embodiment of the present invention. A dial plate unit 200 and a luminous indicator 210 are used instead of the dial plate unit 10 and the indicator 20 of the first embodiment. The dial plate unit 200 is composed of the dial plate 10a of the first embodiment 10a, the cold cathode fluorescent lamp 10b of the first embodiment, and a different light conducting plate 201.

The indicator 210 molded from the same material as the light conducting plate 10c. A base portion 210a of the indicator 210 has beveled reflecting surfaces 213 and 214, which are covered by a light shield cover 211.

The light conducting plate 201 guides the light emitted from the lamp 10b through a beveled reflecting surface 201a to the indicator 210. The light guided into the indicator 210 is reflected by the beveled reflecting surfaces 213 and 214 toward the head of a pointer 210b as indicated by arrows La and Lb to illuminate the indicator.

If the light conducting plate is made of colored material, the dial plate 10a can provide colored illumination.

Figure 31:
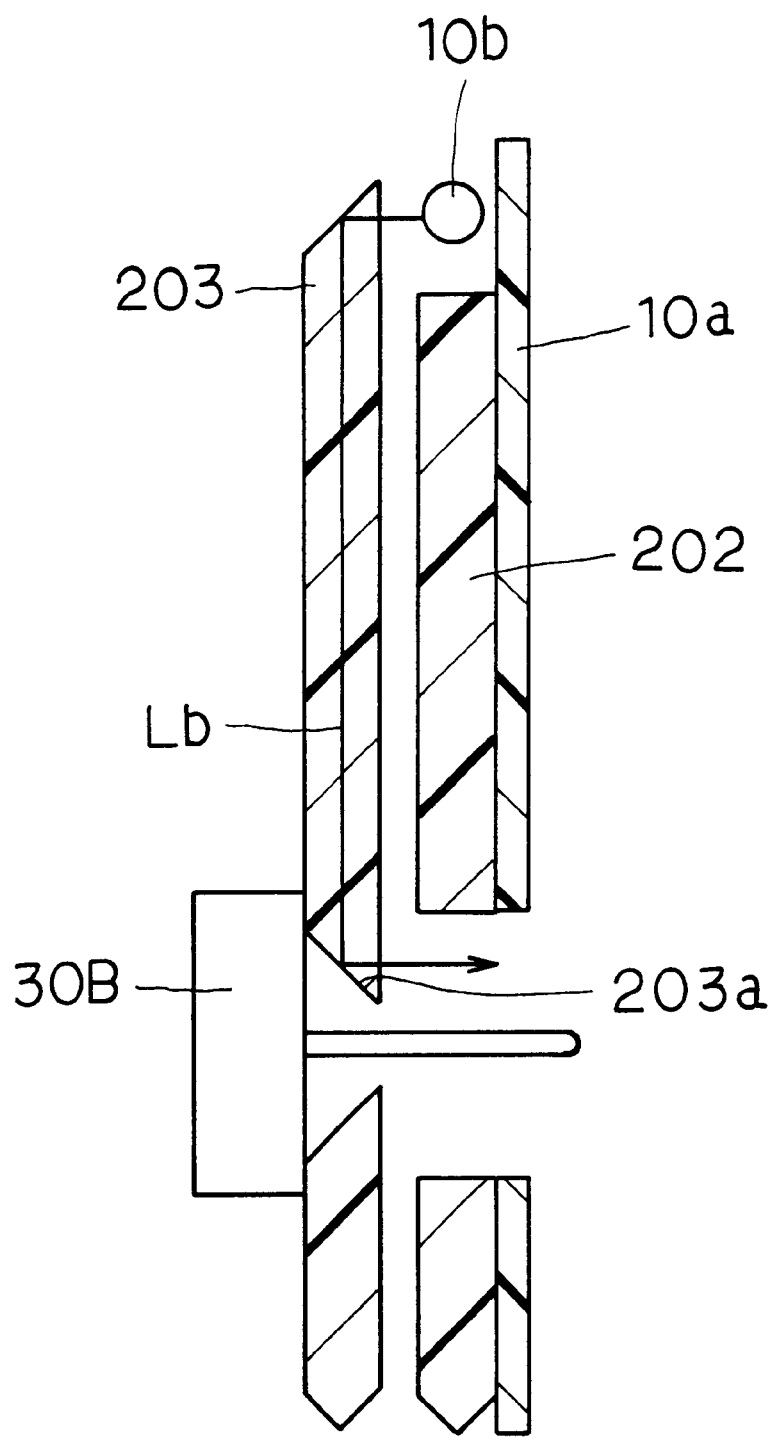
FIG. 31 is a cross-sectional view illustrating a main portion of a variation of the fourth embodiment.

FIG. 31 illustrates a variation of the fourth embodiment. the light conducting plate 201 is replaced with a pair of light conducting plates 202 and 203. The driving unit 30 of the first embodiment is replaced with a driving unit 30B. The light conducting plate 202 guides the light of the cold cathode fluorescent lamp 10b to the dial plate la as described before. The light conducting plate 203 is disposed apart from the plate 202. The plate 203 has beveled reflecting surfaces 203a and guides the light emitted from the lamp 10b to the base portion 210a of the indicator 210 ( shown in FIG. 29) as indicated by an arrow Lb in FIG. 31.

Figure 32:
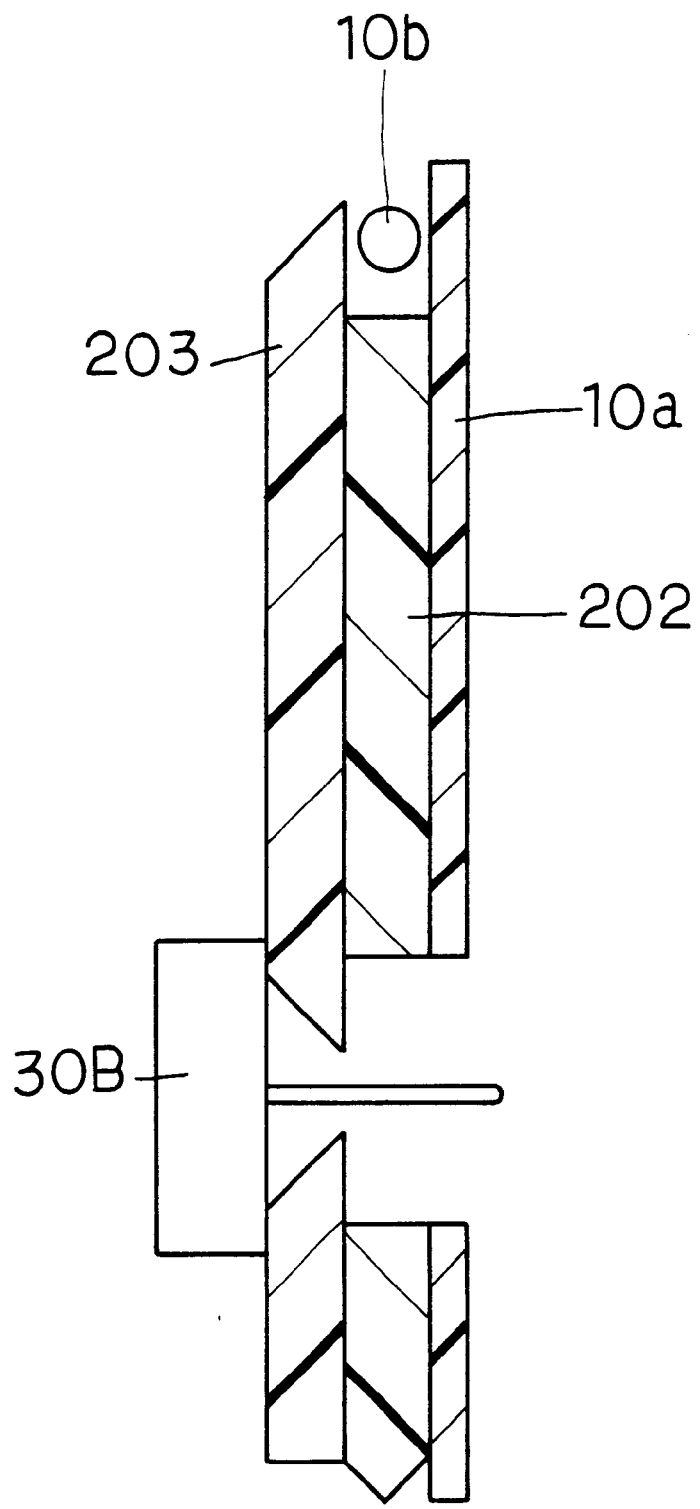
FIG. 32 is a cross-sectional side view of a main part illustrating a variation of the indicator illustrated in FIG. 31.

The light conducting plate 203 can be disposed in contact with the light conducting plate 202 as illustrated in FIG. 32.

Figure 33:
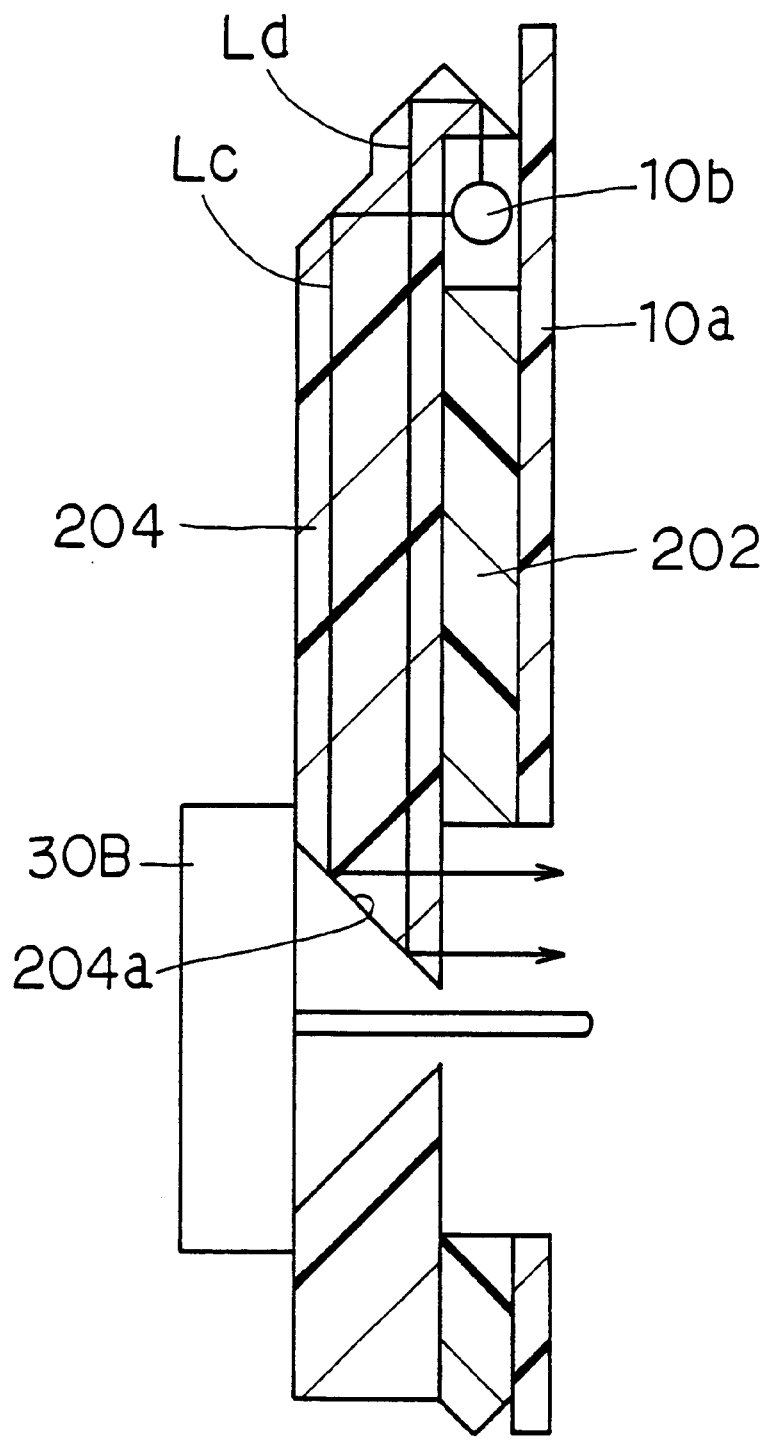
FIG. 33 is a cross-sectional side view of a main part illustrating a variation of the indicator illustrated in FIG. 32.

The light conducting plate 203 can be replaced with a light conducting plate 204 as illustrated in FIG. 33. The light conducting plate 204 has a reflecting surface for turning light back in addition to a beveled reflecting surface at a portion near the cold cathode fluorescent lamp 10b so as to guide the light toward the indicator 210 as indicated by arrows Lc and Ld.

This variation utilizes the light of the cold cathode fluorescent lamp 10b more effectively.

Figure 34:
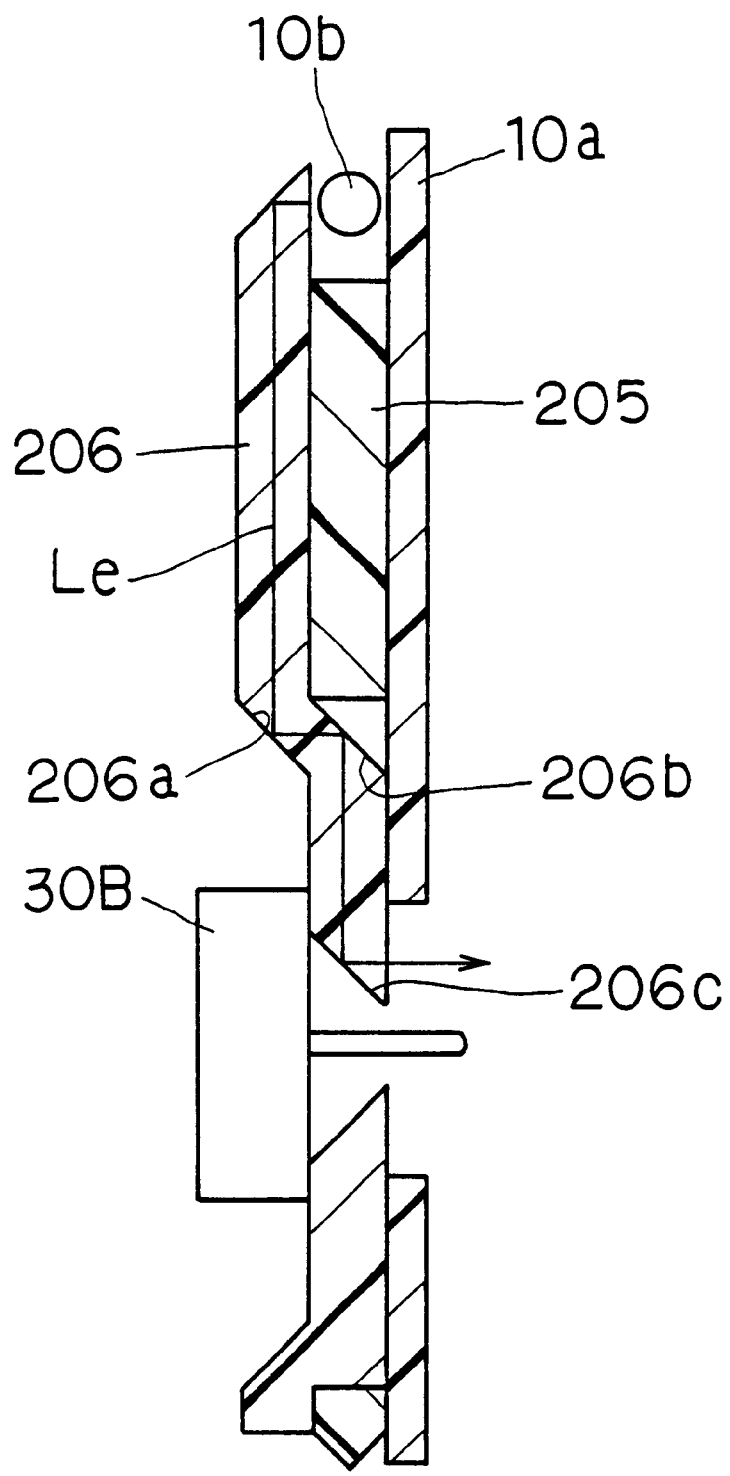
FIG. 34 is a cross-sectional side view of a main part illustrating another variation of the indicator illustrated in FIG. 32.

The light conducting plates 202 and 203 of the variation illustrated in FIG. 32 are replaced with light conducting plates 205 and 206 shown in FIG. 34. The functions of both plates 205 and 206 are substantially the same as the variation illustrated in FIG. 32. In this variation, the light in the plate 206 is guided as indicated by an arrow Le. Reference numerals 206a, 206b and 206c indicate beveled reflecting surfaces respectively.

Since the light conducting plate 206 has a central recess in this variation, thickness of the indicating instrument is reduced.

Figure 35:
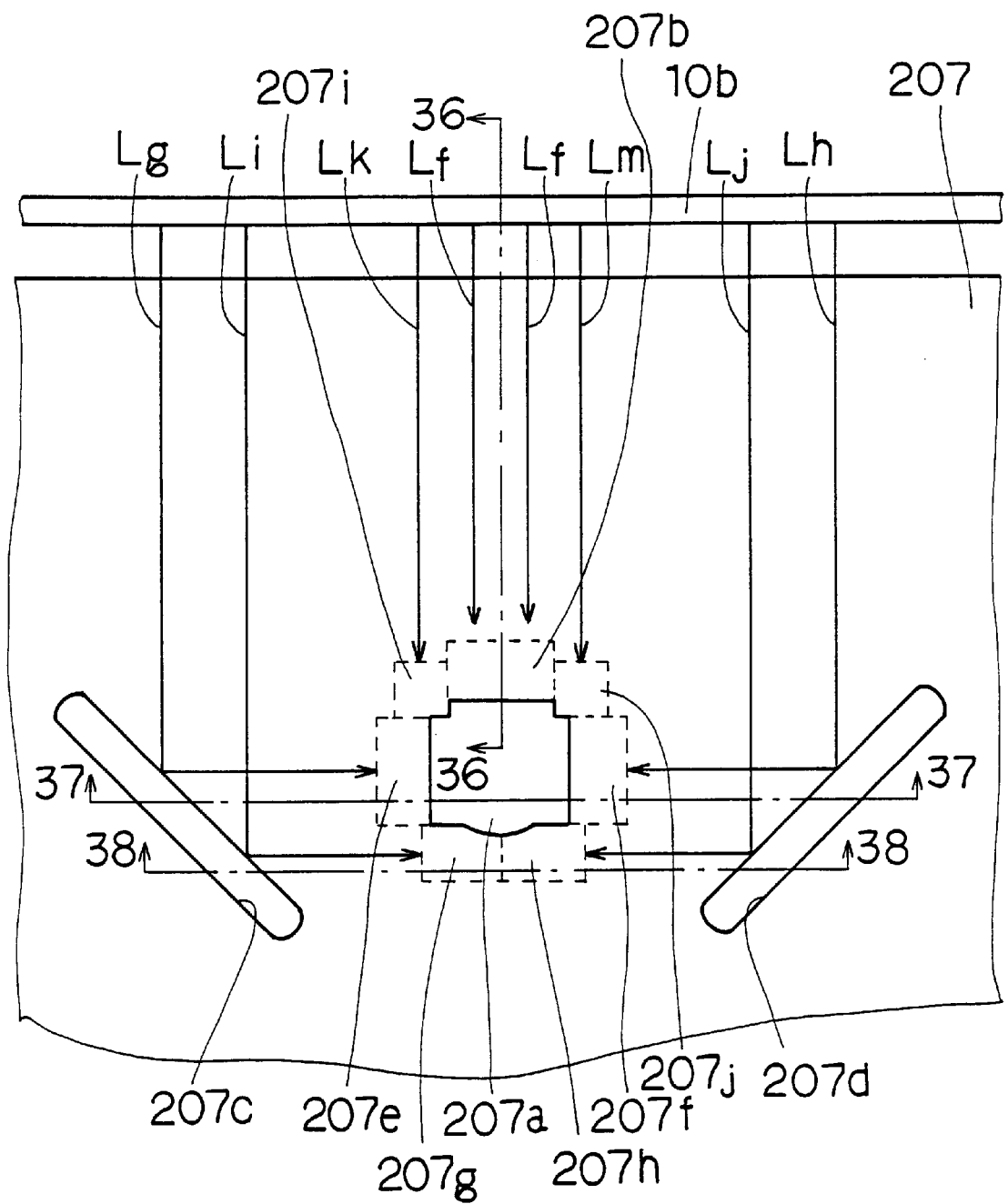
FIG. 35 is a plan view illustrating another variation of the fourth embodiment.
Figure 36:
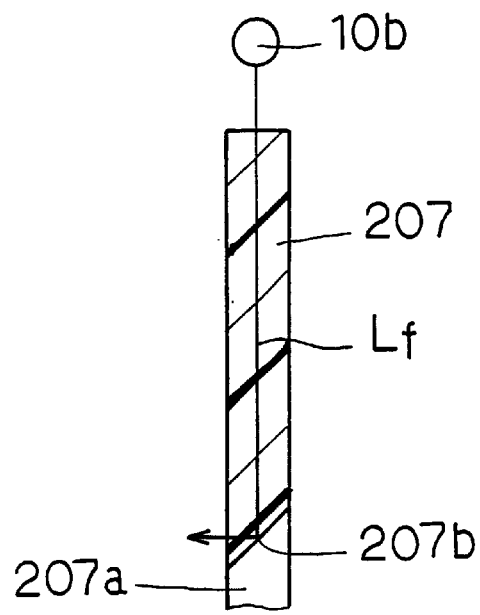
FIG. 36 is a cross-sectional side view cut along a line 36—36 in FIG. 35.

The light conducting plate 201 of the fourth embodiment illustrated in FIG. 29 is replaced with a light conducting plate 207 as illustrated in FIG. 35 and FIG. 36. The light conducting plate 207 has a generally rectangular through hole 207a instead of the circular hole to receive the columnar support 212 (shown in FIG. 35). A beveled reflecting surface 207b is formed at a side of the rectangular through hole 207a facing the fluorescent lamp 10b so that the light guided from the lamp 10b is guided along an arrow indicated by Lf toward the indicator 210.

Figure 37:
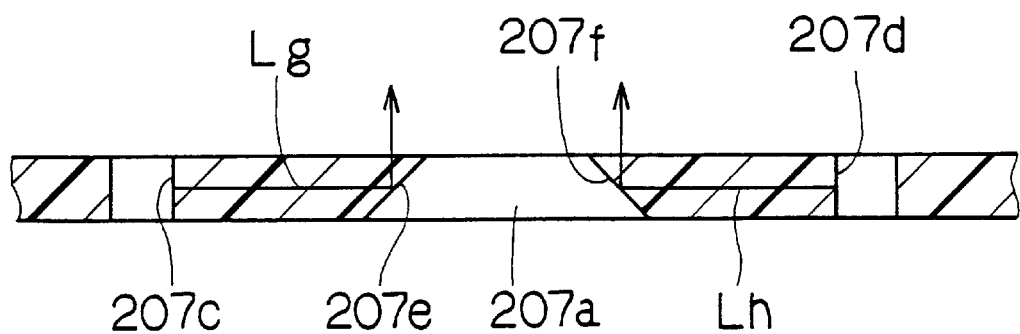
FIG. 37 is a cross-sectional side view cut along a line 37—37 in FIG. 35.
Figure 38:
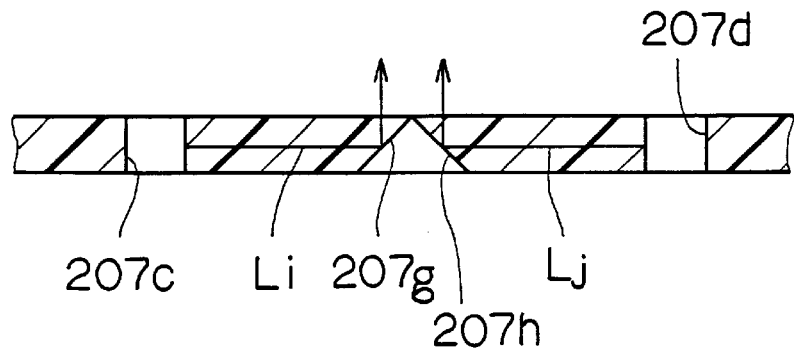
FIG. 38 is a cross-sectional side view cut along a line 38—38 in FIG. 35.

Other beveled reflecting surfaces 207e, 207f, 207g, 207h 207i and 207j are also formed around the rectangular through hole to guide the light of the lamp 10b along arrows Lg, Lh, Li, Lj, Lk and Lm. Two diagonal slits 207c and 207d are formed in the light conducting plate 207 to provide reflecting surfaces in the optical paths indicated by the arrows Lg, Li, Lh and Lj as illustrated in FIGS. 36, 37 and 38.

The above variation utilizes the light emitted by the cold, cathode fluorescent lamp more effectively.

Figure 39:
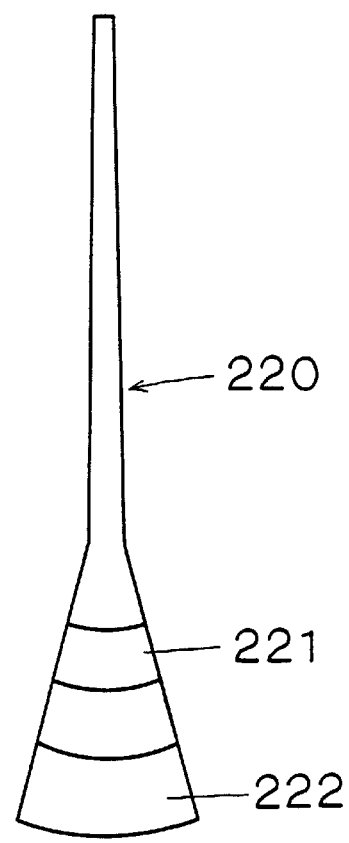
FIG. 39 is a plan view illustrating a variation of the luminous indicator illustrated in FIG. 29.
Figure 40:
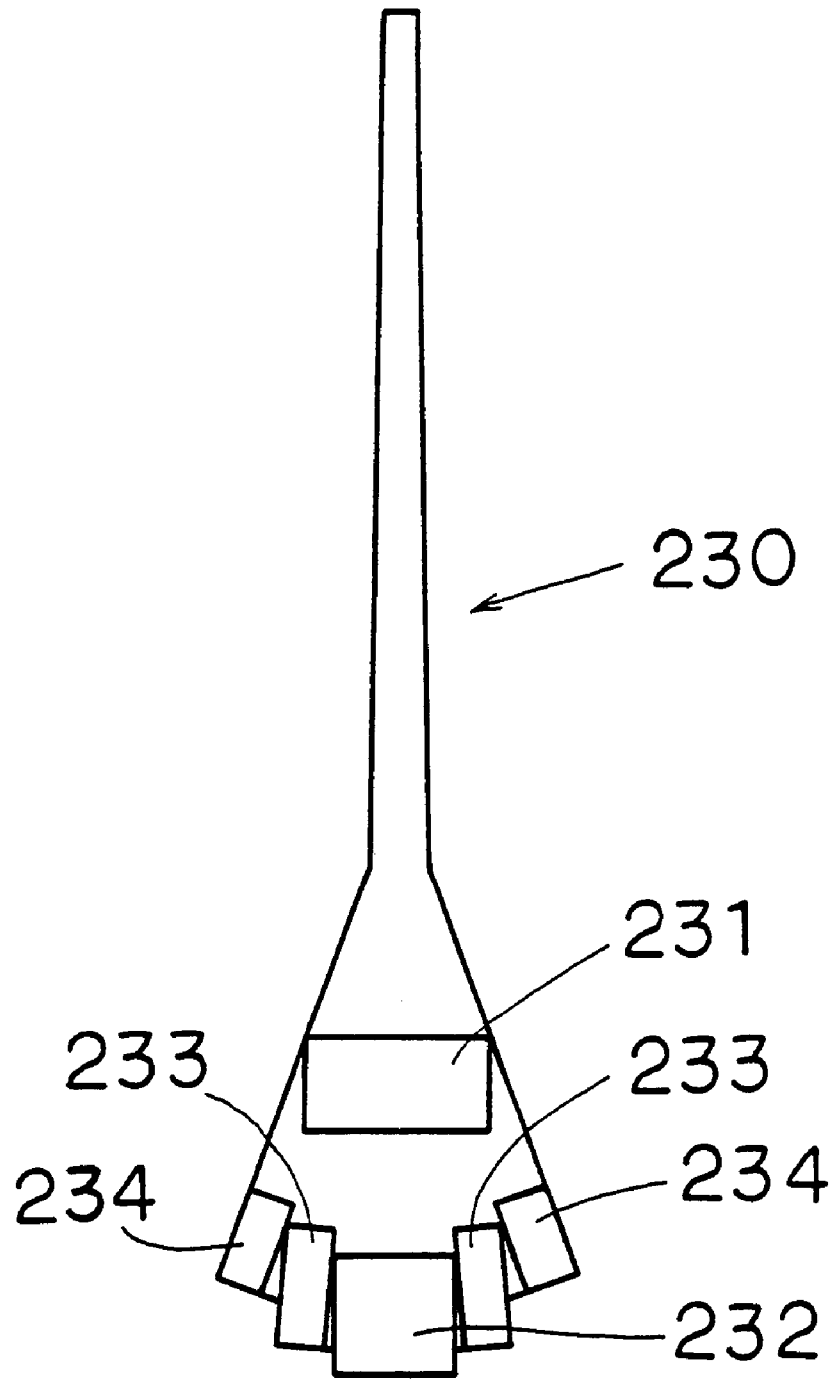
FIG. 40 is a plan view illustrating another variation of the luminous indicator illustrated in FIG. 29.

FIG. 39 and FIG. 40 illustrate other variations of the indicator 210.

An indicator 220 has curved reflecting surfaces 221 and 222. Another indicator 230 has a flat reflecting surface 231 which corresponds to the reflecting surface 213 shown in FIG. 29 and a plurality of flat reflecting surfaces 232, 233 and 234 which corresponds to the reflecting surface 214 shown in FIG. 29. The reflecting surfaces 233 and 234 are formed symmetrically on the indicator 230.

Figure 41:
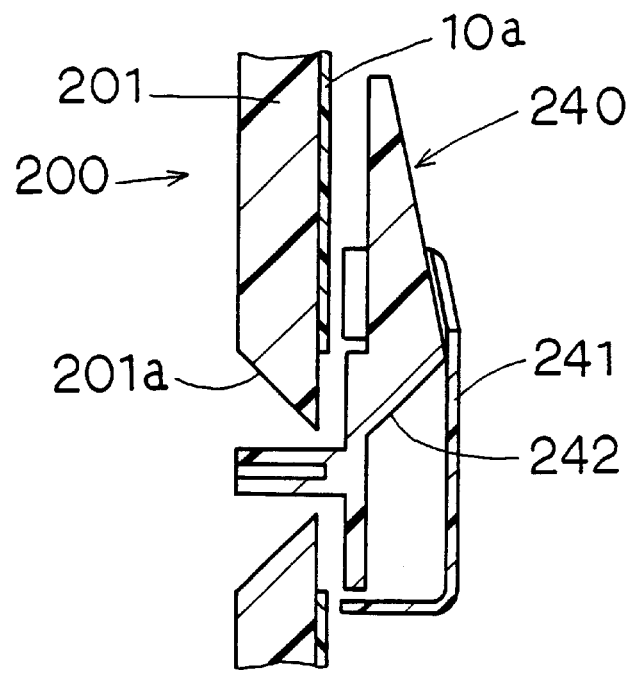
FIG. 41 is a cross-sectional view illustrating another variation of the luminous indicator illustrated in FIG. 29.
Figure 42:
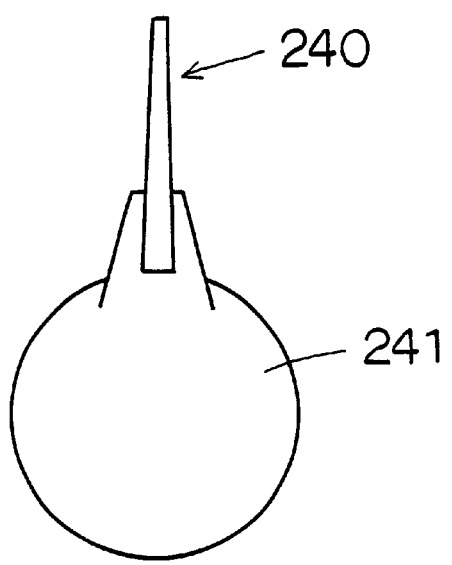
FIG. 42 is a plan view illustrating the luminous indicator illustrated in FIG. 29.

The indicator 210 of the fourth embodiment can be replaced with a luminous indicator 240 as illustrated in FIG. 41 and FIG. 42.

Figure 43:
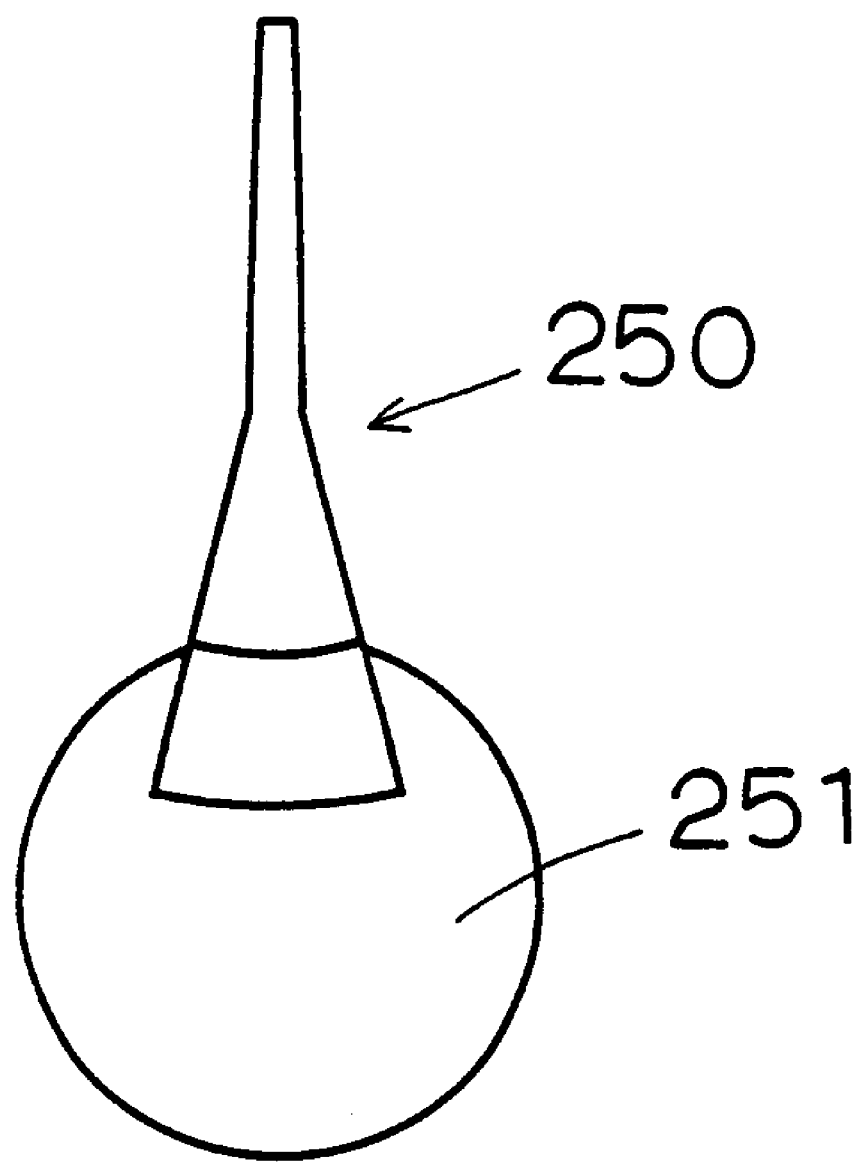
FIG. 43 is a plan view illustrating a variation of the luminous indicator illustrated in FIG. 41.

The indicator 240 has a pointer which is shorter than the indicator 210 and has a light shield cover 241 (which corresponds to the cover 211) on its base portion. Only one beveled reflecting surface 242 is formed on the base portion of the indicator 240. Other portions are the same as the fourth embodiment. The luminous indicator 240 can be replaced with an indicator 250 with a cover 251 as shown in FIG. 43.

(Fifth Embodiment)

Figure 44:
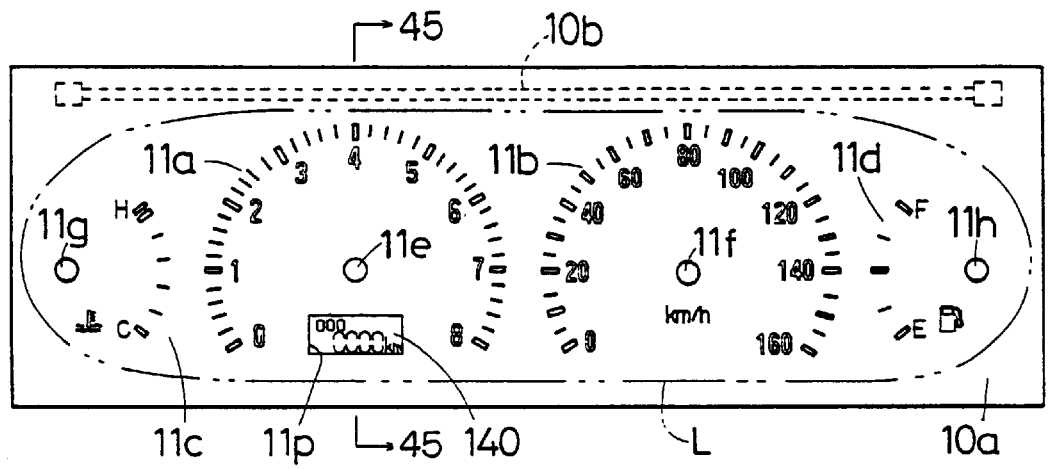
FIG. 44 is a front view illustrating a main portion of an indicating instrument according to a fifth embodiment of the present invention.
Figure 45:
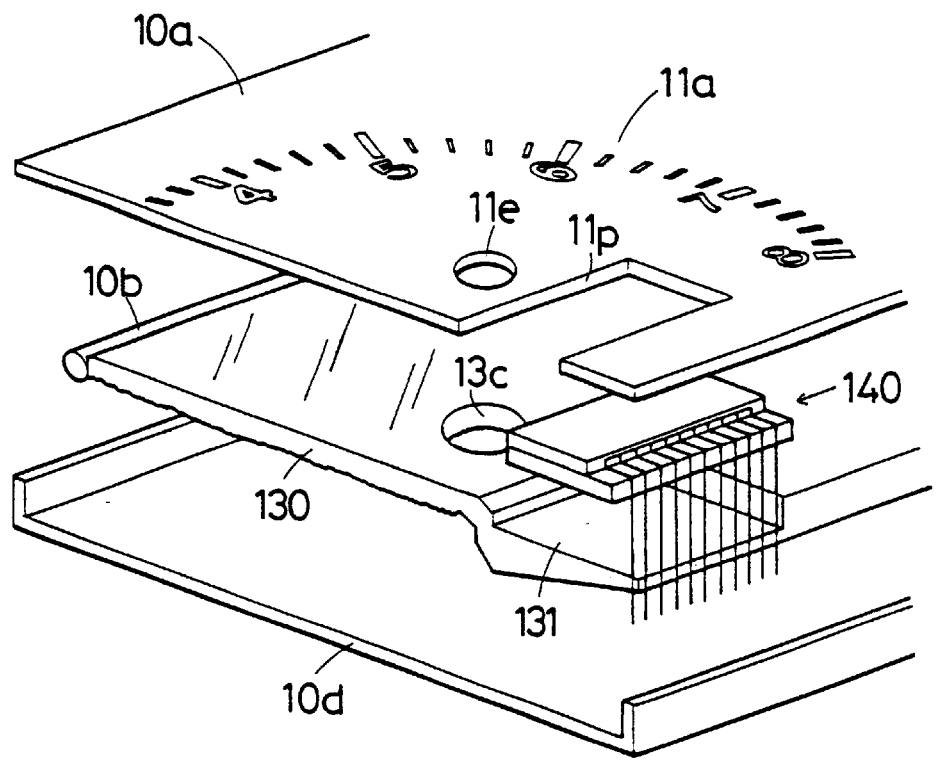
FIG. 45 is an exploded view illustrating main portions of a dial plate, a light conducting plate, a holder and a liquid crystal panel of the indicating instrument cut along a pair of lines 45—45 in FIG. 44.

FIG. 44 and FIG. 45 illustrate an indicating instrument according to a fifth embodiment of the present invention. The light conducting plate 10c and the pattern indicating the unit of the vehicle speed (e.g. km/h) of patterned trans-illuminous portion 11b of the first embodiment is replaced with a light conducting plate 130 and an odometer 140 composed of a transmission-type liquid-crystal-display.

The light conducting plate 130 has a rectangular recess 131 at a portion corresponding to an opening 11p of the dial plate 10a, where the odometer 140 is fixed as illustrated in FIG. 45. The liquid crystal display of the odometer 140 is illuminated by a part of the light guided in the light conducting plate 10a.

(Sixth Embodiment)

An indicating instrument according to a sixth embodiment of the present invention is described with reference to FIG. 46 and FIG. 47.

Figure 46:
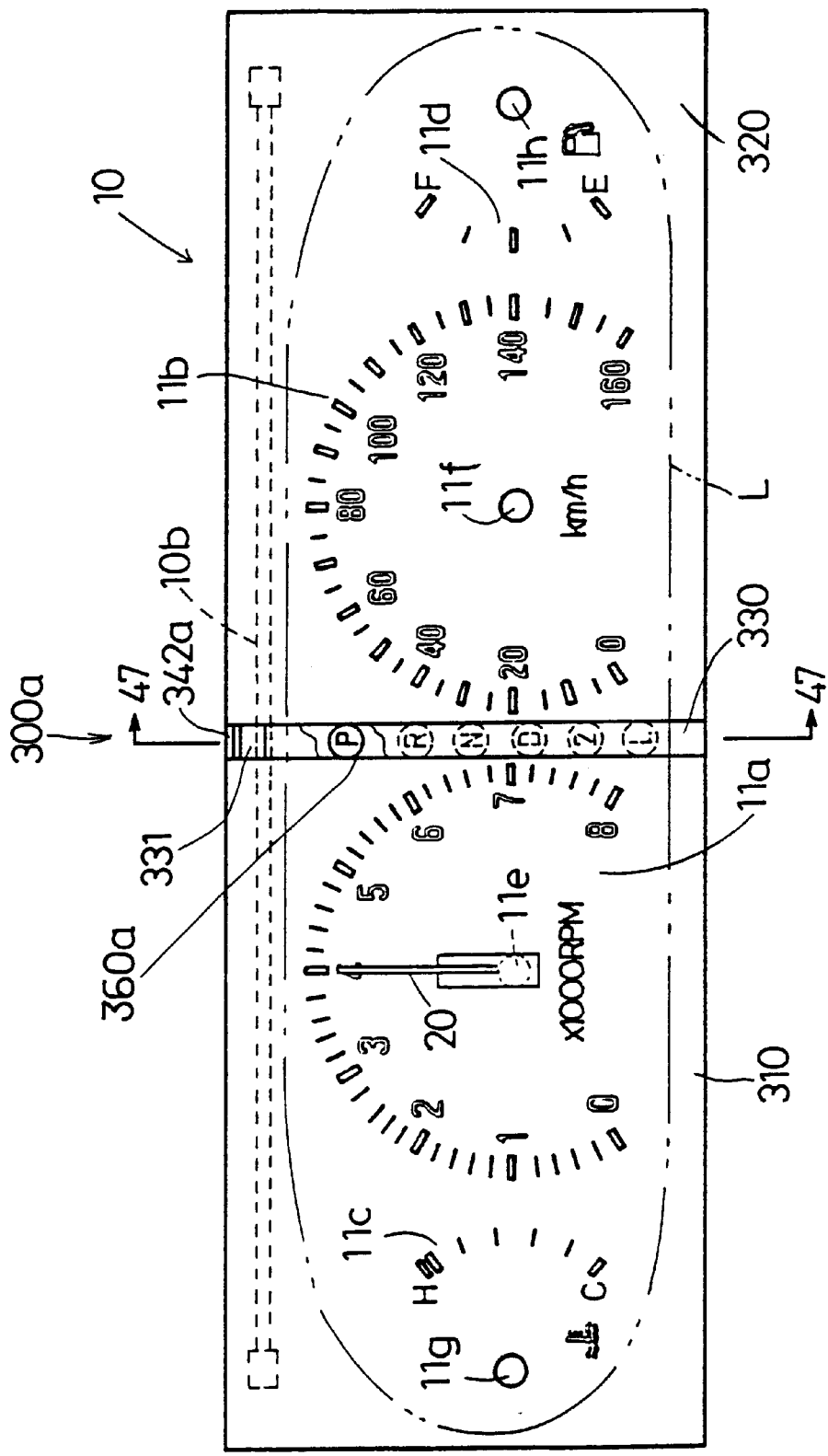
FIG. 46 is a front view illustrating a main portion of an indicating instrument according to a sixth embodiment of the present invention.
Figure 47:
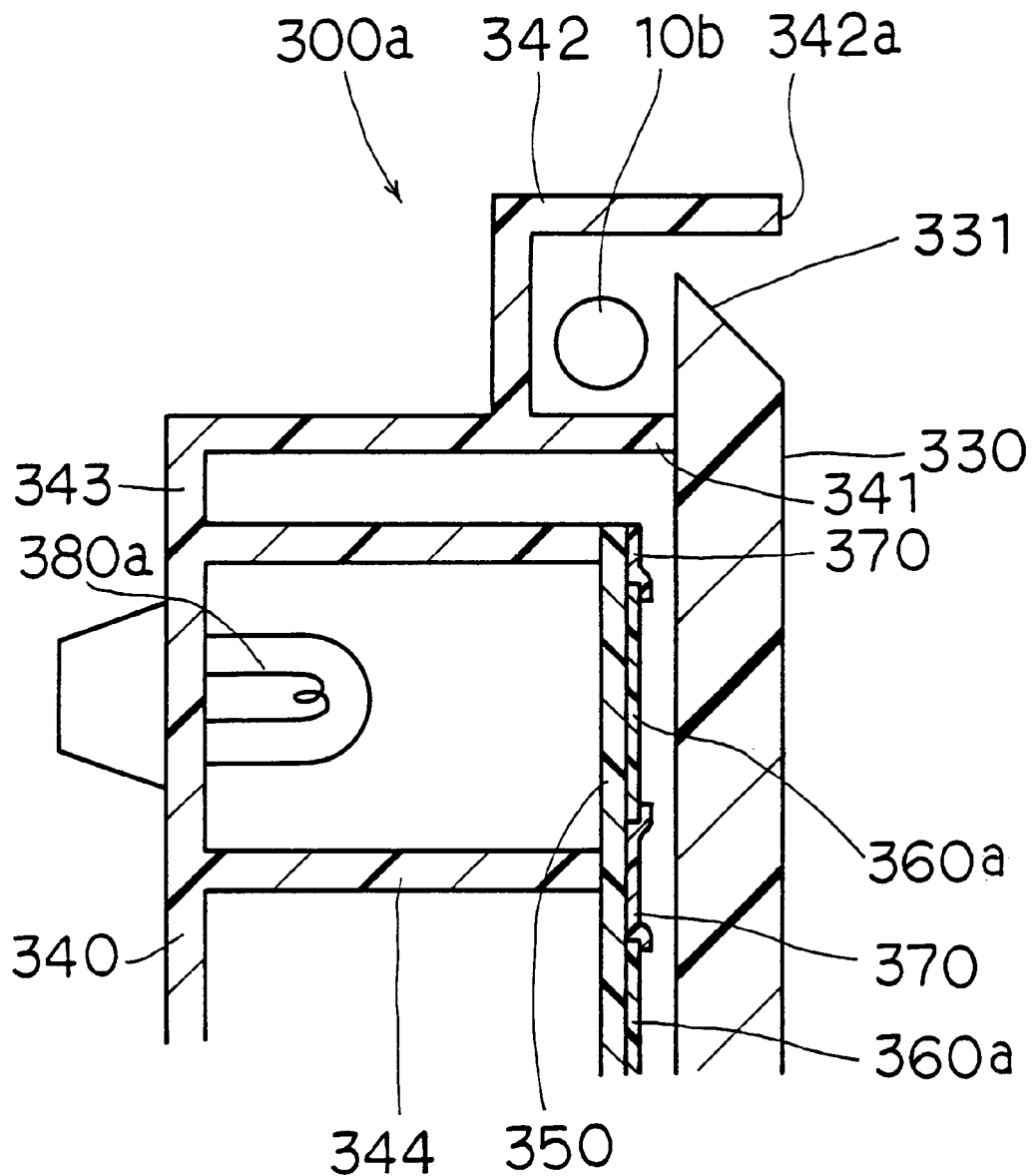
FIG. 47 is a cross-sectional side view cut along a pair of lines 47—47 illustrated in FIG. 46.

The dial plate unit 10 of the first embodiment is replaced by a dial plate unit 300 as illustrated in FIG. 46.

The dial plate unit 300 has a pair of dial plates 310 and 320 and a gear shift indicator 300a therebetween. The indicator 300a has a narrow light conducting plate 330 made of the same material as the conducting plate 10c. The light conducting plate 330 has a beveled reflecting surface 331 at an upper end thereof as illustrated in FIG. 47 to reflect the light guided thereto downward.

The indicator 300a has a light shield casing 340 which is fixed to the back of the light conducting plate 330, a plurality of cylindrical members 344 with lamps 380a and a flat indicator lens 350 which covers the cylindrical members 344. The light shield casing 340 has L-shaped light shield cover 342 covering a part of the cold cathode fluorescent lamp and the beveled reflecting surface 331. The cover 342 has an open end 342a exposed to the front outside as illustrated in FIG. 47. A plurality of colored symbols 360a corresponding to the gear positions (e.g. P, R, N, D, 2, L) are printed on the indicator lens 350 at portions corresponding to the respective cylindrical members 344 as shown in FIG. 46. Portions surrounding the colored symbols 360a are covered by a printed opaque coating 370 to shield the light. Thus, each of the colored symbols is illuminated when the corresponding lamp is turned on.

(Seventh Embodiment)

Figure 48:
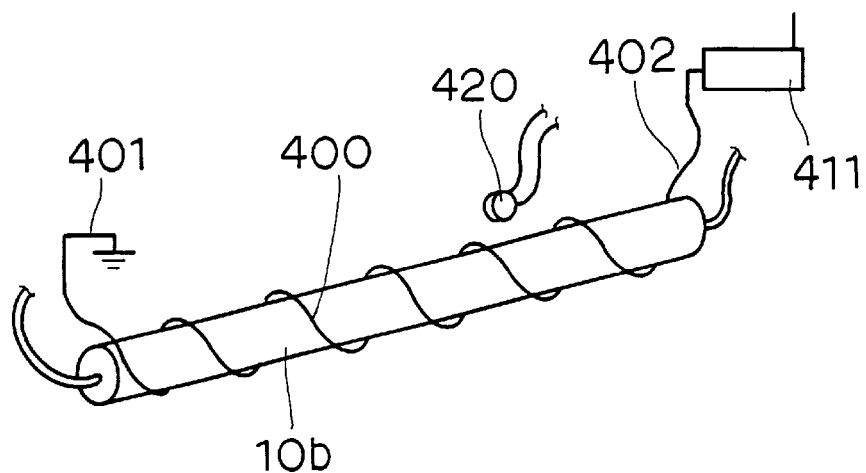
FIG. 48 is a schematic view illustrating a main portion of an indicating instrument according to a seventh embodiment of the present invention.
Figure 49:
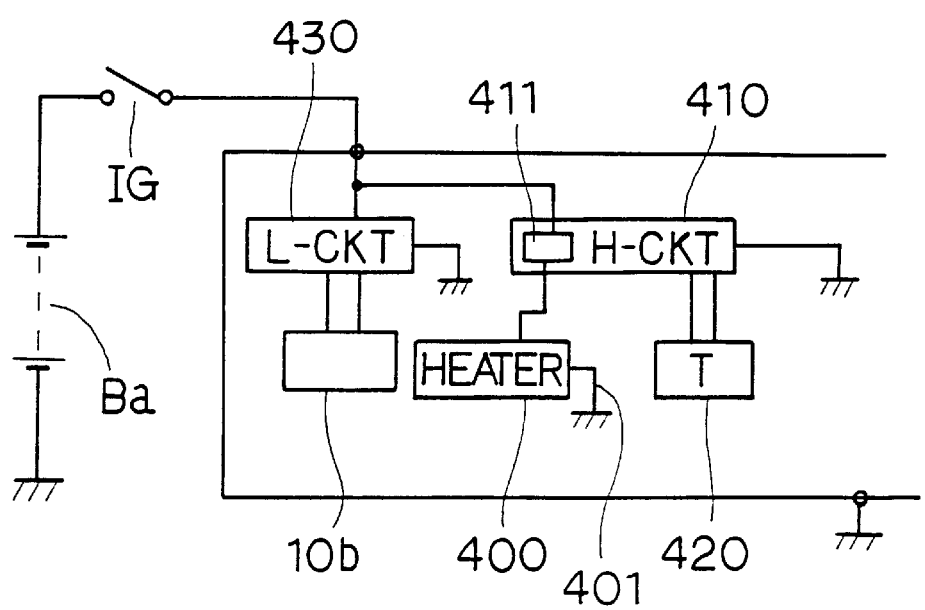
FIG. 49 is a circuit diagram for driving a cold cathode fluorescent lamp and a heater.

An indicator instrument according to a seventh embodiment of the present invention is described with reference to FIG. 48 and FIG. 49. The tape-like heater 12 of the first embodiment is replaced with coiled heater 400 wound around the cold cathode fluorescent lamp 10b. The heater 400 is a wire made of a ferrite alloy of about 0.15 mm in diameter which is composed of chromium (22%), aluminum (4.8%), and iron (73.2%). An end 401 of the heater 400 is grounded and the other end is connected to a battery Ba through a switching element 411 of a heater circuit 410 and a key switch IG. The heater circuit 410 turns on the switching element 411 when temperature of the cold cathode fluorescent lamp 10b is detected to be lower than a designated temperature and supplies electric power to the heater 400 from the battery Ba. A light source circuit energizes the cold cathode fluorescent lamp 10b. Other portions are the same as the first embodiment.

Since the heater 400 is grounded, the radio noise (mainly AM-band radio frequency) can be absorbed by the heater. Since the heater is wound around the lamp 10b, it functions as a supplementary electrode to lower the driving voltage.

The patterned trans-illuminous portions can be formed directly on the conducting plate 10c instead of the dial plate 10a. Other straight lamps can be replaced with the cold cathode fluorescent lamp 10b. The trans-illuminous portions and the other opaque portions of the dial plate 10a of the indicating instruments according to the previously described embodiments can be replaced with each other so that the indicator and the dial scales remain dark in the illuminated back surface.

The indication instrument according to the present invention can be used for various purposes other than vehicles.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. An indicating instrument comprising:

a holder having at least a pair of elongated sides;

a dial plate fixed to said holder and having a plurality of patterned trans-illuminous portions;

an illumination lamp;

a light conducting plate disposed in said holder behind said dial plate and having a longitudinal groove accommodating said illumination lamp to be coplanar therewith, said light conducting plate having a light receiving surface and a light reflecting surface, said light receiving surface being disposed at a periphery adjacent to said groove to convey light from said illumination lamp into an interior of said light conducting plate in a direction transverse to said illumination lamp, said light reflecting surface reflecting said conveyed light toward said plurality of patterned trans-illuminous portions;

a driving unit disposed behind said dial plate, said driving unit having a driving shaft extending outward through said light conducting plate and said dial plate;

an indicator connected to said driving shaft to rotate over said dial plate; and a light diffusing member disposed in said groove behind said dial plate.

2. An indicating instrument comprising:

a first plate having a plurality of patterned trans-illuminous portions, said plurality of patterned trans-illuminous portions being arranged in a prescribed manner;

a straight illumination lamp disposed behind said first plate;

a second plate disposed behind said first plate for conducting light from said illumination lamp to said patterned trans-illuminous portions, said second plate having a longitudinal groove for accommodating said illumination lamp at the back thereof along said trans-illuminous portions, said groove having a light diffusing surface at the bottom thereof;

a driving unit disposed behind said first plate, said driving unit having a shaft extending outward through a hole formed in said second plate and said first plate; and an indicator connected to said shaft for rotating over said first plate.

3. The indicating instrument as claimed in claim 2, wherein said indicator comprises a boss portion carried by said shaft.

* * * * *